United States Patent
Sarma et al.

(10) Patent No.: US 11,803,562 B2
(45) Date of Patent: Oct. 31, 2023

(54) METHOD AND SYSTEM FOR QUERYING STREAMING DATA

(71) Applicant: YAHOO ASSETS LLC, Dulles, VA (US)

(72) Inventors: Akshai Sarma, Sunnyvale, CA (US); Michael Natkovich, San Francisco, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 672 days.

(21) Appl. No.: 15/197,306

(22) Filed: Jun. 29, 2016

(65) Prior Publication Data

US 2018/0004818 A1 Jan. 4, 2018

(51) Int. Cl.
*G06F 16/24* (2019.01)
*G06F 16/2458* (2019.01)
*G06F 16/248* (2019.01)
*G06F 16/2455* (2019.01)

(52) U.S. Cl.
CPC ........ *G06F 16/2477* (2019.01); *G06F 16/248* (2019.01); *G06F 16/24568* (2019.01)

(58) Field of Classification Search
CPC .......... G06F 17/30867; G06F 17/3053; G06F 17/3089; G06F 17/30424; G06F 17/30554; G06F 17/30; G06F 17/30312; G06F 17/30598; G06F 17/30646; G06F 17/30657; G06F 17/30696; G06F 17/30699; G06F 17/30991; G06F 16/951; G06F 16/9535; G06F 16/245; G06F 16/00; G06F 16/243; G06F 16/2457; G06F 16/248; G06F 16/3325; G06F 16/3331; G06F 16/337; G06F 16/338; G06F 16/9038; G06F 17/30401; G06F 17/30864; G06F 16/2477; G06F 16/24568
USPC .......... 707/707, 17.108, 722, 769, 728, 732, 707/17.014, 17.017, 713, 723, 735, 748, 707/749, 999.003, 705, 766, 802, 725
See application file for complete search history.

(56) References Cited

U.S. PATENT DOCUMENTS

| | | | | |
|---|---|---|---|---|
| 10,311,061 | B2 * | 6/2019 | Ji | G06F 16/24568 |
| 2008/0040321 | A1 * | 2/2008 | Baeza-Yates | G06F 16/2477 |
| 2013/0103658 | A1 * | 4/2013 | Travis | G06F 16/2477 |
| | | | | 707/700 |
| 2014/0095425 | A1 * | 4/2014 | Sipple | G06N 7/005 |
| | | | | 706/52 |
| 2016/0092484 | A1 * | 3/2016 | Finkler | G06F 16/258 |
| | | | | 707/715 |

* cited by examiner

*Primary Examiner* — Alford W Kindred
*Assistant Examiner* — Cecile H Vo
(74) *Attorney, Agent, or Firm* — Venable LLP

(57) ABSTRACT

The present teaching relates to streaming data querying and providing query results. In one example, a query is received for events happening after receipt of the query. A plurality of data records are obtained, where each of the data records corresponds to an event happening after receipt of the query. For each of the plurality of data records, it is determined whether the data record matches the query. Based on the determining, one or more query results are determined and provided as a response to the query.

20 Claims, 14 Drawing Sheets

METHOD AND SYSTEM FOR QUERYING STREAMING DATA

BACKGROUND

1. Technical Field

The present teaching relates to methods, systems, and programming for Internet services. Particularly, the present teaching is directed to methods, systems, and programming for querying streaming data and providing query results.

2. Discussion of Technical Background

Data querying is a process of asking questions of data in search of a specific answer. Data being queried may be stored persistently in a data base. For example, online search, usually conducted through search engines, is a process of interactively searching for and retrieving requested information via an application running on a local user device, such as a computer or a mobile device, from online databases.

In practice, many data are in transit and not stored persistently for processing, e.g. streaming data that flows through a streaming system without being persistently stored therein. While existing querying techniques focus on querying persistently stored data, querying streaming data according to existing techniques requires persistently storing the streaming data first. This will require very large space for data storage in this big data era. In addition, existing querying techniques focus on the backward-looking query, i.e. a query looking for events that have happened before submission of the query or receipt of the query. Furthermore, existing querying techniques suffer a low input/output (I/O) efficiency when processing multiple queries at the same time.

Therefore, there is a need to provide an improved solution for data querying to solve the above-mentioned problems.

SUMMARY

The present teaching relates to methods, systems, and programming for Internet services. Particularly, the present teaching is directed to methods, systems, and programming for querying streaming data and providing query results.

In one example, a method, implemented on a machine having at least one processor, storage, and a communication platform capable of connecting to a network for providing query results is disclosed. A query is received for events happening after receipt of the query. A plurality of data records are obtained, where each of the data records corresponds to an event happening after receipt of the query. For each of the plurality of data records, it is determined whether the data record matches the query. Based on the determining, one or more query results are determined and provided as a response to the query.

In a different example, a method, implemented on a machine having at least one processor, storage, and a communication platform capable of connecting to a network for providing query results is disclosed. A plurality of queries is received within a predetermined time period. Each of the plurality of queries is submitted for querying events happening after receipt of the query. A plurality of data records are obtained, where each of the data records corresponds to an event happening after receipt of the plurality of queries. For each of the plurality of data records, it is determined whether the data record matches any of the plurality of queries. Based on the determining, one or more query results are determined for each of the plurality of queries. The one or more query results are provided as a response to a corresponding query in the plurality of queries.

In another example, a system having at least one processor, storage, and a communication platform connected to a network for providing query results is disclosed. The system comprises: a request processor configured for receiving a query for events happening after receipt of the query; a streaming data standardizer configured for obtaining a plurality of data records each of which corresponds to an event happening after receipt of the query; a streaming data sub-processor configured for determining, for each of the plurality of data records, whether the data record matches the query; and a query result generator configured for generating, based on the determining, one or more query results, and providing the one or more query results as a response to the query.

In yet another example, a system having at least one processor, storage, and a communication platform connected to a network for providing query results is disclosed. The system comprises: a request processor configured for receiving, within a predetermined time period, a plurality of queries, wherein each of the plurality of queries is submitted for querying events happening after receipt of the query; a streaming data standardizer configured for obtaining a plurality of data records each of which corresponds to an event happening after receipt of the plurality of queries; a plurality of streaming data sub-processors configured for determining, for each of the plurality of data records, whether the data record matches any of the plurality of queries; and a plurality of query result combiners configured for generating, based on the determining, one or more query results for each of the plurality of queries, and providing the one or more query results as a response to a corresponding query in the plurality of queries.

Other concepts relate to software for implementing the present teaching on streaming data querying. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for providing query results is disclosed. The information, when read by the machine, causes the machine to perform the following: receiving a query for events happening after receipt of the query; obtaining a plurality of data records each of which corresponds to an event happening after receipt of the query; determining, for each of the plurality of data records, whether the data record matches the query; generating, based on the determining, one or more query results; and providing the one or more query results as a response to the query.

In another example, a machine-readable, non-transitory and tangible medium having information recorded thereon for providing query results is disclosed. The information, when read by the machine, causes the machine to perform the following: receiving, within a predetermined time period, a plurality of queries, wherein each of the plurality of queries is submitted for querying events happening after receipt of the query; obtaining a plurality of data records each of which corresponds to an event happening after receipt of the plurality of queries; determining, for each of the plurality of data records, whether the data record matches any of the plurality of queries; generating, based on the determining, one or more query results for each of the plurality of queries; and providing the one or more query results as a response to a corresponding query in the plurality of queries.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
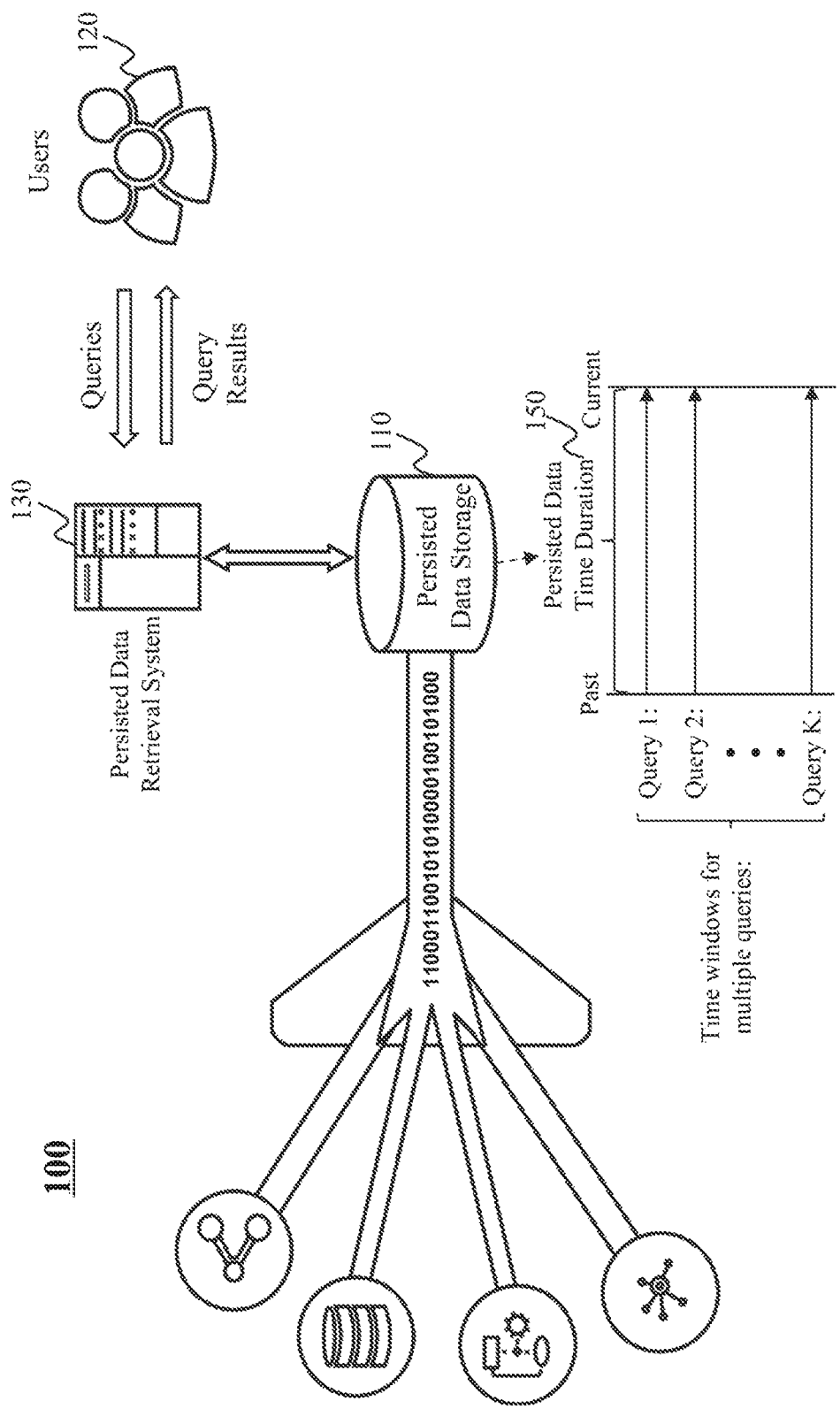
FIG. 1 is a high level depiction of an exemplary networked environment for data querying, according to prior art.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure describes method, system, and programming aspects of efficiently and effectively querying streaming data or real time data in transit, without the need to have the data be persisted. Streaming or low-latency data currently needs to be persisted in order to support multiple, arbitrary queries. The system disclosed in the present teaching can operate on a streaming system that is performing its original task while providing the capability to query it. Instead of running queries on a finite set of data that arrived and had been persisted, the query in the present teaching can be executed against an infinite set of data that arrives after the query is submitted. The system disclosed in the present teaching may look forward, while existing systems look back.

The method of querying data in transit according to the present teaching can be scalable independently on the volume of data in transit and/or the number of simultaneous queries supported. It may also be plugged into any streaming data pipeline. Current stream processing systems consume an entire stream of data on their own, while executing a query defined at startup for the lifetime of a stream or until the query needs to be modified, e.g. Spark SQL. The system according to the present teaching may create a multi-tenant environment, where multiple queries can be executed against the data stream simultaneously. The queries are not bound to infinitely run against the data stream, but being executed for a finite time window, which may be part of the query definition.

By introducing a querying capability for streaming pipelines, the system disclosed according to the present teaching can avoid the latency caused by the need to persist data into a system for querying. This can drop the latency of inspecting the data from a streaming pipeline from minutes/hours to what the latency of the streaming system itself is, e.g. seconds. The system disclosed in the present teaching can be scalable by adding machines with just a constant amount of latency that is negligible in practice.

If the streaming system's data needs to be inspected ad-hoc and a history of all the data is not needed, the method in the present teaching may remove the need for a persistence layer. Depending on how large the data volume is and what queries need to be supported, this can result in the saving of an expensive, query system on a persistence layer, including the operability costs of maintaining it.

Queries that aim to sample or otherwise iterate on results may be exceptionally suited for the querying system described in the method disclosed in the present teaching since queries are ad-hoc and the disclosed method does not use additional resources unless queries are present in the system. Components in the disclosed system can be scaled independently in two ways, for increasing data volume from the streaming system or increasing number of queries, which provides flexibility and efficiency in utilization resources.

The terms "searching" and "querying" may be used interchangeably herein to refer to generic information retrieval based on a condition.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for querying data, according to prior art. In FIG. 1, the exemplary networked environment 100 includes a persisted data storage 110, one or more users 120, and a persisted data retrieval system 130. The persisted data storage 110 stores persistently data from various sources, e.g. Internet sources. A user, e.g., one of the users 120, may send a query to the persisted data retrieval system 130 and receive query results from the persisted data retrieval system 130. The query received by the persisted data retrieval system 130 is for querying data that have already been persistently stored at the persisted data storage 110 before the query is received. As shown in FIG. 1, when the persisted data retrieval system 130 receives multiple queries in a same time period, e.g. queries 1, 2 . . . K, each of the K queries is directed for persisted data in a same time duration 150 from a past timing point to current timing point when the multiple queries are received. For multiple queries, e.g. two queries, received at the same time, the persisted data retrieval system 130 queries all data in the persisted data storage 110 to determine query results for one query, before querying data in the persisted data storage 110 based on the other query.

Figure 2:
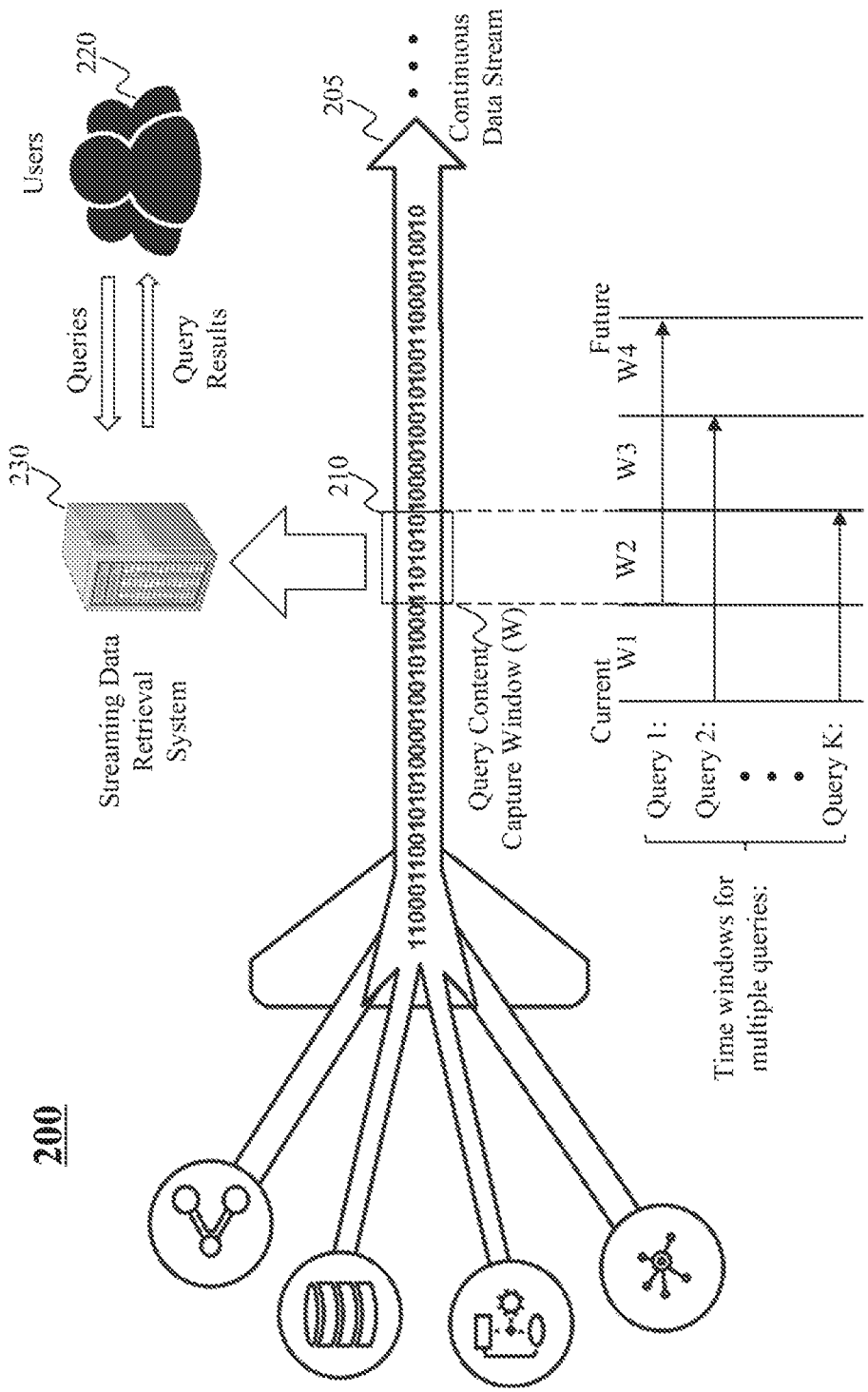
FIG. 2 is a high level depiction of an exemplary networked environment for data querying, according to an embodiment of the present teaching.

FIG. 2 is a high level depiction of an exemplary networked environment 200 for querying data, according to an embodiment of the present teaching. In FIG. 2, the exemplary networked environment 200 includes a continuous data stream 205, one or more users 220, and a streaming data retrieval system 230. The continuous data stream 205 includes real time data in transit, e.g. a constant flow of data passing by without stop. The data in the continuous data stream 205 are not stored persistently. The streaming data retrieval system 230 can capture data in the continuous data stream 205 when the data pass a query content capture window 210, which is denoted as W in FIG. 2. A user, e.g., one of the users 220, may send a query to the streaming data retrieval system 230 and receive query results from the streaming data retrieval system 230. The query received by the streaming data retrieval system 230 is for querying streaming data that will come and pass the query content capture window 210 after the query is received. When a data record reaches the query content capture window 210, the streaming data retrieval system 230 may capture the data record and generate projected copies of the data record if the data record matches some queries from the users 220. Then, the streaming data retrieval system 230 will send all of the projected copies to corresponding users submitting the queries. After the data record passes the query content capture window 210, the streaming data retrieval system 230 will not have any copy of the data record stored persistently on the streaming data retrieval system 230.

As shown in FIG. 2, when the streaming data retrieval system 230 receives multiple queries in a same time period, e.g. queries 1, 2 . . . K, each of the K queries is directed for streaming data in a corresponding time window from a current timing point when the query is received to a future timing point when the corresponding time window ends. For example, when K=3 in FIG. 2, the streaming data retrieval system 230 will process two queries (query 2 and query K) together during query content capture window W1; will process three queries (query 1, query 2 and query K) together during query content capture window W2; will process two queries (query 1 and query 2) together during query content capture window W3; and will process two queries (query 1) together during query content capture window W4.

When there are multiple queries being processed together in a query content capture window, the streaming data retrieval system 230 queries one data record passing by the query content capture window 210 and filters the data record with all of the multiple queries, before querying the next data record passing by the query content capture window 210. For example, during the query content capture window W2, the streaming data retrieval system 230 scans a data record passing by the query content capture window 210 only once and compares the data record with each of the queries 1, 2, and K, to generate one or more projected copies of the data record when the scanned data record matches one or more of the queries 1, 2, and K. Then, the streaming data retrieval system 230 may discard the scanned data record and start to scan the next data record passing by the query content capture window 210 for data querying. In this manner, the streaming data retrieval system 230 will have a high I/O efficiency, because it minimizes the number of scans of the streaming data records, which usually have a very large volume if not an infinite volume.

The method disclosed in the present teaching may allow any streaming system to query arbitrary data in transit in an efficient and optimal manner, without persistently storing the data. This may have numerous benefits and can help answer many questions depending on the nature of data flowing through the streaming pipeline.

One of the primary, obvious problems solved by such a system is data validation. For instance, if the events flowing through the streaming system are instrumentation events or "beacons" from users to a web page or mobile app and the streaming system is performing ETL (extract, transform and load) of the events, the creator of the instrumentation can generate the beacons and use the system to query for it to ensure that the beacons are currently formatted and the ETL pipeline is processing it correctly. This process may require repeated iterations by the instrumentation creator. The longer the feedback goes back to the creator, the slower any validation and development becomes.

A brute force approach may be querying the standard batch pipeline once it makes the hourly data available, which implies at least one-hour latency for the interval to complete. Then some period of time to process, write, and query can make the feedback loop on the order of hours. The next attempt may be to read a stream, create mini-batches of data, persistently store the mini-batches, and register the batches in a metadata store to make the records able to be queried. Finally, a query could be executed to find the records. The approach reduced the latency to several minutes, but was quite expensive to run as just a stream was coupled with a persistence layer and a distributed execution engine. The approach disclosed in the present teaching may be to constantly scan the stream for any records matching the submitted queries. It has no batching, persistence, or separate query layer. In the existing approaches, multiple queries being executed over the same time period would require a scan of the data for each query. In contrast, the approach disclosed in the present teaching needs only one scan of the data as all the queries are simultaneously executed against the same data set. This makes the system disclosed in the present teaching have the fastest latency and minimal resource requirements among the three approaches.

There are many other domain (data specific) problems that can be solved with a querying system that can operate with low latency and high efficiency on a streaming pipeline. While the initial problem being addressed may be data validation, once the system was introduced, other use cases may emerge. The system disclosed in the present teaching allows for validation of code releases by querying the data as soon as a release happens to see the corresponding records coming through the system. For example, when the NFL Live Stream was happening, this could show that there were records coming in for that live event. It allows for data exploration of values for various columns, before running more expensive queries over persisted datasets. In advertising, it would allow the ability to quickly see if records were coming in for a given advertiser, creative, or publisher. For third party developers in Flurry, it could allow much faster insights on either instrumentation or user responses on a record level.

According to one embodiment, the users 220 may communicate with the streaming data retrieval system 230 over a network that may be a single network or a combination of different networks. For example, the network may be a local area network (LAN), a wide area network (WAN), a public network, a private network, a proprietary network, a Public Telephone Switched Network (PSTN), the Internet, a wireless network, a virtual network, or any combination thereof.

Users 220 may be of different types such as users connected to the network via desktop computers, laptop computers, a built-in device in a motor vehicle, or a mobile device. In one embodiment, users 220 may be connected to the network and able to interact with the streaming data retrieval system 230 through wired or wireless technologies and related operating systems implemented within user-wearable devices (e.g., glasses, wrist watch, etc.).

The continuous data stream 205 may come from various content sources. A content source may correspond to a website hosted by an entity, whether an individual, a business, or an organization such as USPTO.gov, a content provider such as cnn.com and Yahoo.com, a social network website such as Facebook.com, or a content feed source such as tweeter or blogs.

Figure 3:
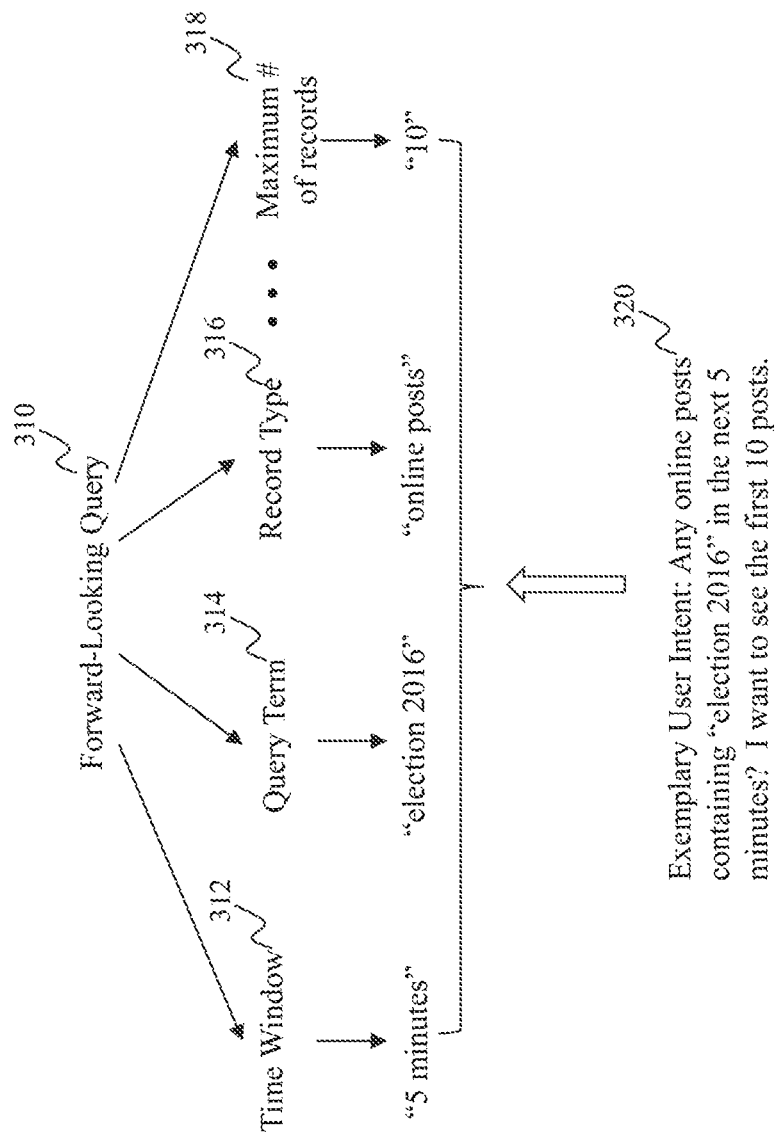
FIG. 3 illustrates information specified by an exemplary forward-looking query corresponding to an exemplary user intent, according to an embodiment of the present teaching.

FIG. 3 illustrates information specified by an exemplary forward-looking query 310 corresponding to exemplary user intent, according to an embodiment of the present teaching. As shown in FIG. 3, a forward-looking query 310 corresponds to exemplary user intent 320 where a user may wonder if there are any online posts containing "election 2016" in the next 5 minutes and the user wants to see the first 10 such posts. This intent may be explicitly expressed by the user or inferred by the streaming data retrieval system 230, e.g. based on online activities of the user. In this example, the streaming data retrieval system 230 may form the forward-looking query 310 to specify different components of the query definition. For example, the time window 312 for the forward-looking query 310 is "5 minutes," which means the forward-looking query 310 will be compared with data records coming within 5 minutes from receipt of the forward-looking query 310. The query term 314 in this example for the forward-looking query 310 is "election 2016," which means the streaming data retrieval system 230 will filter data records to generate projected data records that include the query term "election 2016." The record type 316 in this example for the forward-looking query 310 is "online posts," which means the streaming data retrieval system 230 will generate projected data records based on data records from online posts. The maximum number of records 318 in this example for the forward-looking query 310 is "10," which means the streaming data retrieval system 230 will generate at most 10 projected data records in response to the forward-looking query 310. In this example, the user will receive either 10 projected online posts that contain the term "election 2016," or receive X, which is less than 10, projected online posts if the streaming data retrieval system 230 determines that there are only X data records matching the query term within the 5 minutes time window.

One skilled in the art can understand that there may be more component features of the forward-looking query 310. The streaming data retrieval system 230 may determine these component features as specification information of the forward-looking query 310 after receiving the forward-looking query 310.

Figure 4:
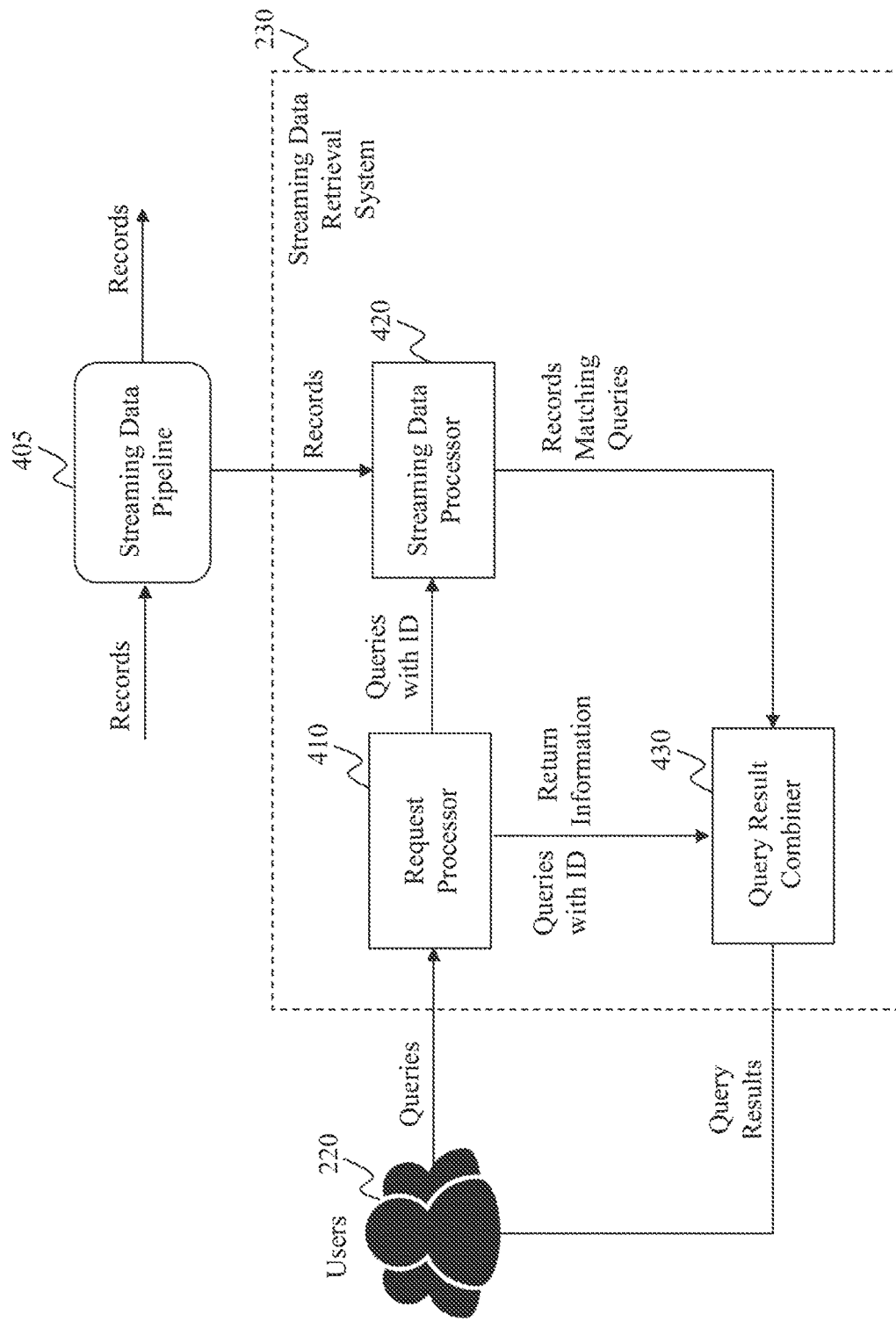
FIG. 4 illustrates an exemplary diagram of a streaming data retrieval system, according to an embodiment of the present teaching.

FIG. 4 illustrates an exemplary diagram of a streaming data retrieval system 230, according to an embodiment of the present teaching. The streaming data retrieval system 230 in this example includes a request processor 410, a streaming data processor 420, and a query result combiner 430.

A query submitted by a user to the request processor 410 may specify a time window or a duration on which it will operate. The query can also specify the maximum number of records to collect. In general, each of the queries as shown or referred to in FIGS. 4-12 can be a forward-looking query as illustrated in FIG. 3.

The request processor 410 in this example is responsible for receiving queries from the users 220 and generating two pieces of information for each query: a unique identifier (ID) for the query and return information for returning results for the query. The unique ID for the query may be used for generating and combining data records matching this query.

The return information is about the user submitting the query, such as IP address and port of the user. The return information may indicate where the results of the query are to be sent to.

According to one embodiment, the request processor 410 may generate two records for each query: the first record is of the form <unique ID, query> and the second record is of the form <unique ID, return information>. The request processor 410 may send the first record both to the streaming data processor 420 for data filtering and to the query result combiner 430 for result aggregation. The request processor 410 may send the second record to the query result combiner 430 for result delivery. In one example, the mechanism by which the records are sent is as follows.

The request processor 410 broadcasts the first record to all the machines in the streaming data processor 420.

The request processor 410 uses a hash table—a mechanism to generate a unique number for the ID. This number identifies a unique Combiner machine in 430. Using this hash to identify the machine, the request processor 410 may send both the first and the second records to the identified machine. In this example, only a single Combiner machine receives each pair of <unique ID, query> and <unique ID, return information> that involve the same unique ID.

The streaming data processor 420 in this example is responsible for processing the streaming data records and emitting matched data records for each query. The streaming data processor 420 may capture streaming data passing by the system via a query content capture window, as discussed before in FIG. 2. In one embodiment, as a data record passes by the query content capture window, a streaming data pipeline 405 can divert the data record to the streaming data processor 420, e.g. a copy of the data record may be captured by the streaming data processor 420 for data querying without impacting the data processing at the streaming data pipeline 405.

When there are multiple machines in the streaming data processor 420, the data is split across all of the machines in the streaming data processor 420, e.g. in a random manner to ensure equal load across the machines. Since the <unique ID, query> record is broadcasted by the request processor 410, all the machines in the streaming data processor 420 can receive it.

For each query, all the machines in the streaming data processor 420 may then look at the data records for the time window specified in the query. Each machine checks to see if a filter corresponding to the query matches the record. If the record matches, some projections in the query may also be applied to generate and emit a single record of the form <unique ID, projected record> to the query result combiner 430. If this record does not match any of the queries active in the current query content capture window, the streaming data processor 420 does not emit anything but continue to check next record from the data stream passing 405.

The filters and projections to be executed may be either broadcasted by the request processor 410 or generated at the streaming data processor 420. The streaming data processor 420 can apply the filters to determine matched records. The streaming data processor 420 can apply a projection to a matched record or send the matched record as-is for every matched record. Each emitted record is tied to the unique ID that can identify the emitted record as a matching record for the query. Each data sub-processor or each machine in the streaming data processor 420 can execute every query that is being evaluated at any given time. If a record matches multiple queries, a copy of the record with the applied projections will be emitted for each corresponding query. If no query is present in the system at a given moment, the streaming data processor 420 emits no records, which can make this topology optimally consume very little resources.

In one embodiment, the streaming data processor 420 may generate the same hash table using the same mechanism as the request processor 410 and identify the same Combiner machine as the request processor 410. It is to this machine that all the records of the form <unique ID, projected record> are sent by the streaming data processor 420. In this example, all matching records corresponding to the same query ID are sent to the same Combiner machine in the query result combiner 430.

The query result combiner 430 in this example is responsible for combining all the matching data records for a query based on the unique IDs, and performing any aggregations that can be specified in the query. The aggregated results are then emitted back to a corresponding user using the return information received from the request processor 410.

In accordance with one embodiment, when there are multiple combiner machines or sub-combiners in the query result combiner 430, each combiner machine receives the record of the form <unique ID, query> and the record of the form <unique ID, return information>, for a corresponding unique ID that is assigned to the machine, e.g. based on the hash table. Then, the combiner machine also starts receiving records of the form <unique ID, projected record> from the streaming data processor 420. For the time window or the maximum number of records specified by the query, the combiner machine collects all the projected records matching the query and performs any aggregations specified by the query. Once all conditions specified in the query are satisfied, the machine in the query result combiner 430 generates the query results of the query. Using the return information, the combiner machine then returns the query results to the user. This embodiment describes a single level of aggregations—i.e. each combiner machine in the query result combiner 430 can handle all the resulting projected records for a corresponding query.

In accordance with another embodiment, when there are multiple machines or sub-combiners in the query result combiner 430, the query result combiner 430 may perform with multiple levels of aggregations, with a multi-level arrangement of machines, e.g. due to scalability or required aggregations. IN this embodiment, each level of machines will reduce the number of projected records being sent to the next level by performing a partial version of the aggregation on the records. The first level machines may receive the <unique ID, query> records that are broadcasted to the first level. The <unique ID, projected record> records are split up across the first level. Finally, the <unique ID, return information> is sent to the last level, which may consist of a single machine configured for finishing up the aggregations and returning the results to the user, like the single combiner machine in the previous embodiment.

As discussed above, the streaming data retrieval system 230 may inject multiple queries simultaneously into a stream processing framework to operate on data in transit. Each query in this example operates on data that arrives after its submission. Other query execution frameworks operate on data at rest that arrived before the query was submitted. The queries can operate on all data arriving during a finite time window, with unknown amount of records in advance. All queries may be executed simultaneously in one continuous scan instead of having a single scan per query in normal query execution frameworks. Queries may be added to a list. As each record arrives, the set of filters for each query is applied to the record. The results in a low latency, zero persistence manner of querying data in transit, which can minimize resource utilization.

The streaming data retrieval system 230 may continuously read input records as they arrive at a predetermined capture window. At any given query content capture time window, the streaming data retrieval system 230 also evaluates between zero and N submitted queries: if there is no submitted query during the capture window, the data read in is discarded optimally by the streaming data retrieval system 230; if a query is submitted to the streaming data retrieval system 230 capture window, the streaming data retrieval system 230 begins listening to the incoming events or records to find a match. A query may specify a set of filters to apply to the input records and a set of fields to project in the output. A query may also include information specifying aggregations to apply to generate the output. A query may terminate once one of the two terminating criteria is met: the number of records matching the set of filters has reached maximum or the maximum running time for the query is reached.

In order to support queries on a streaming pipeline that is processing arbitrary data, the streaming data processor 420 in the streaming data retrieval system 230 may convert each incoming data record into a standard format. The format may be pre-defined thoroughly to support various kinds of data types encountered. The entry point of data into the streaming data processor 420 may be a defined and standardized interface that can read data in this standard format. The streaming pipeline 405 can then redirect any data it wishes to be queried into this interface. The streaming pipeline itself need not be changed in any other manner and can continue its tasks.

Figure 5:
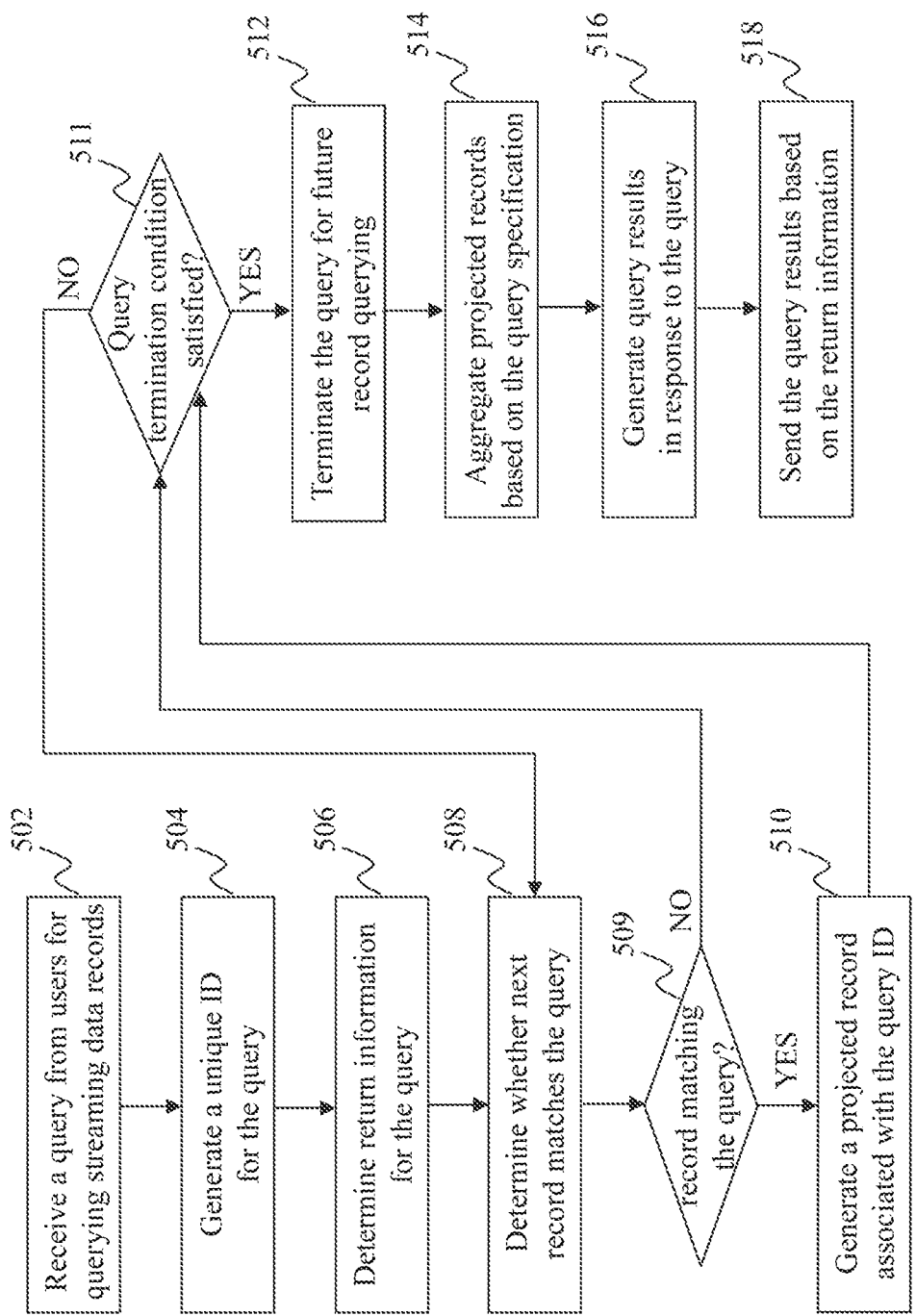
FIG. 5 is a flowchart of an exemplary process performed by a streaming data retrieval system, according to an embodiment of the present teaching.

FIG. 5 is a flowchart of an exemplary process performed by a streaming data retrieval system, e.g. the streaming data retrieval system 230 in FIG. 4, according to an embodiment of the present teaching. A query is received at 502, e.g. within a predetermined query content capture time window, from a user for querying streaming data records. A unique ID is generated at 504 for the query. Return information is determined at 506 for the query. At 508, it is determined whether the next incoming, e.g. captured or scanned, data record matches the query. In one embodiment, the steps 502-508 are repetitively performed all the time, as the streaming data retrieval system 230 continuously processes new queries, new data records, and returning results.

At 509, it is determined whether the record matches the query. If so, the process goes to 510 for generating a projected record associated with the unique ID for the query, and then the process goes to 511. Otherwise, the process goes directly to 511.

At 511, it is determined whether a termination condition is satisfied for the query. If so, the process goes to 512. Otherwise, the process goes back to 508 to determine whether the next incoming record matches the query. A termination condition for a query may be based on time or maximum number of matched records. So even if no record is found for a query, it may be determined at 511 that it is time to return whatever has been found for the query or exit without any query result.

At 512, the query is terminated for future record querying, e.g. the query specification information may be updated to reflect that it should not be included for filtering data records in next capture time window. For example, if records matching the query have reached a maximum number specified by the query, the specification information may be updated to reflect that this query will no longer be used to filter incoming data records from now on. At 514, projected records are aggregated based on the query specification information. For example, records matching a same query may be aggregated to generate a list, a count number, etc. One or more query results may be generated at 516 in response to the query. The query results may be sent at 518 to users based on the return information.

Figure 6:
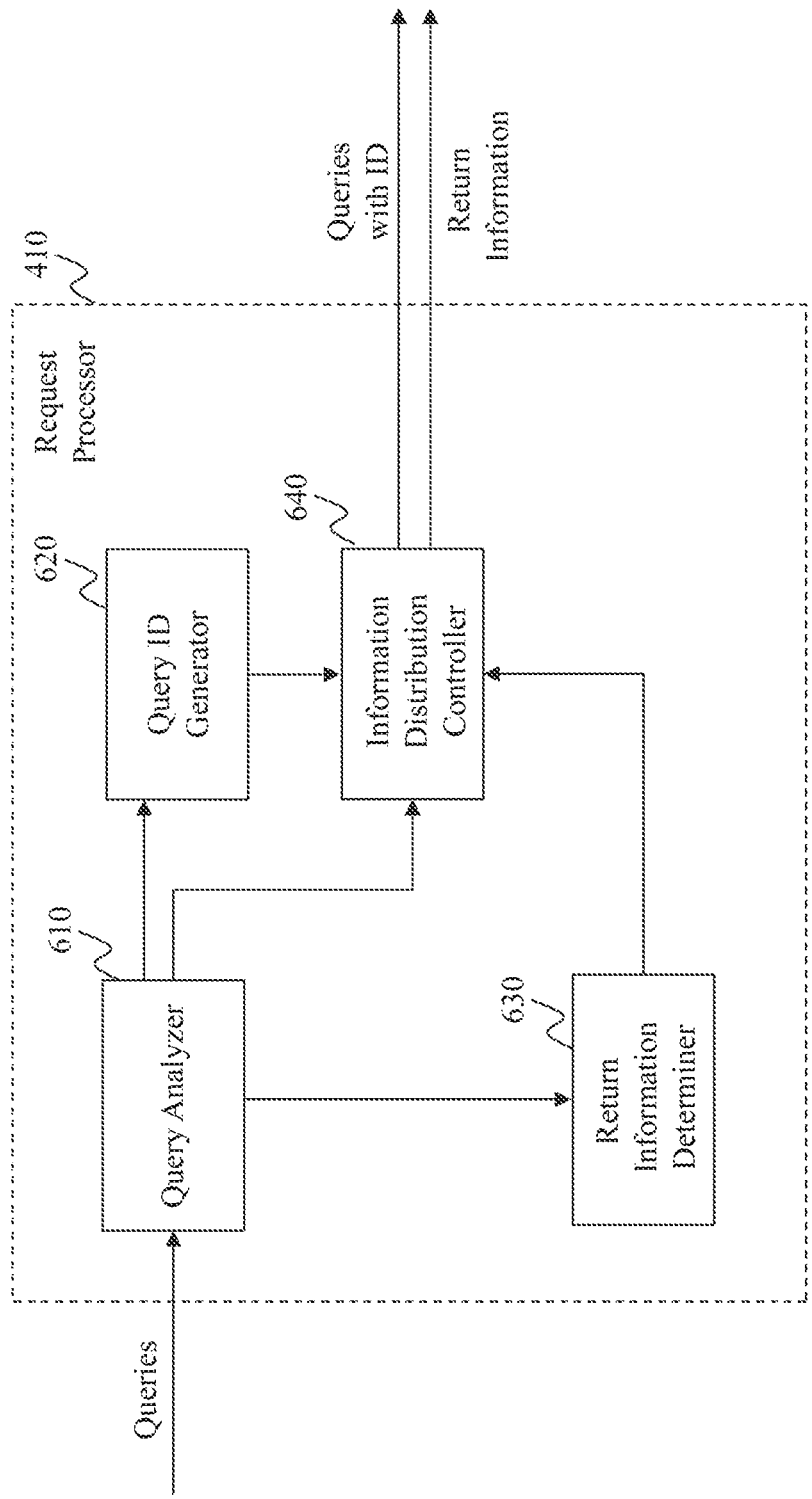
FIG. 6 illustrates an exemplary diagram of a request processor, according to an embodiment of the present teaching.

FIG. 6 illustrates an exemplary diagram of a request processor 410, e.g. the request processor 410 in FIG. 4, according to an embodiment of the present teaching. As shown in FIG. 6, the request processor 410 in this example includes a query analyzer 610, a query ID generator 620, a return information determiner 630, and an information distribution controller 640.

The query analyzer 610 in this example can receive queries from users. As discussed above, each query received here may be used for querying streaming data records that will come after receipt of the query. In one embodiment, the query analyzer 610 may determine the component features of the query, as shown in FIG. 3. The query analyzer 610 can send the query and/or the component features to the query ID generator 620 for generating a unique ID, to the return information determiner 630 for determining return information associated with the user submitting the query, and to the information distribution controller 640 for distributing query records to machines in the streaming data processor 420 and the query result combiner 430.

The query ID generator 620 in this example may receive queries from the query analyzer 610 and generate a unique ID for each of the queries. As discussed above, the unique ID for the query may be used for generating and combining projected data records matching this query. The query ID generator 620 may send the unique ID for each query to the information distribution controller 640 for distributing query records to machines in the streaming data processor 420 and the query result combiner 430.

The return information determiner 630 in this example may receive queries from the query analyzer 610 and determine return information for each of the queries with respect to users submitting the queries. As discussed above, return information may include the IP address and port information of a corresponding user. The return information determiner 630 may send the return information for each query to the information distribution controller 640 for distributing query records to machines in the streaming data processor 420 and the query result combiner 430.

The information distribution controller 640 in this example may receive queries from the query analyzer 610, unique IDs corresponding to the queries from the query ID generator 620, and return information for each query from the return information determiner 630. The information distribution controller 640 may determine how to distribute different types of information to different machines in the system. As discussed above, the information distribution controller 640 may generate two records for each query: the first record is of the form <unique ID, query> and the second record is of the form <unique ID, return information>. The information distribution controller 640 may send the first record both to the streaming data processor 420 for data filtering and to the query result combiner 430 for result aggregation. The information distribution controller 640 may send the second record to the query result combiner 430 for result delivery.

In one embodiment, the request processor 410 may also determine a set of filters to apply to the input records and a set of fields to project in the output, and may send these filters and fields to the streaming data processor 420. In another embodiment, the filters and fields will be generated and determined at the streaming data processor 420.

In another embodiment, the request processor 410 may include multiple machines that can process multiple queries in parallel. This may happen when the number of queries received at the request processor 410 increases. In this case, each of the multiple machines may include the query analyzer 610, the query ID generator 620, the return information determiner 630, and the information distribution controller 640. As such, the system can easily be scaled as the number of queries increases.

Figure 7:
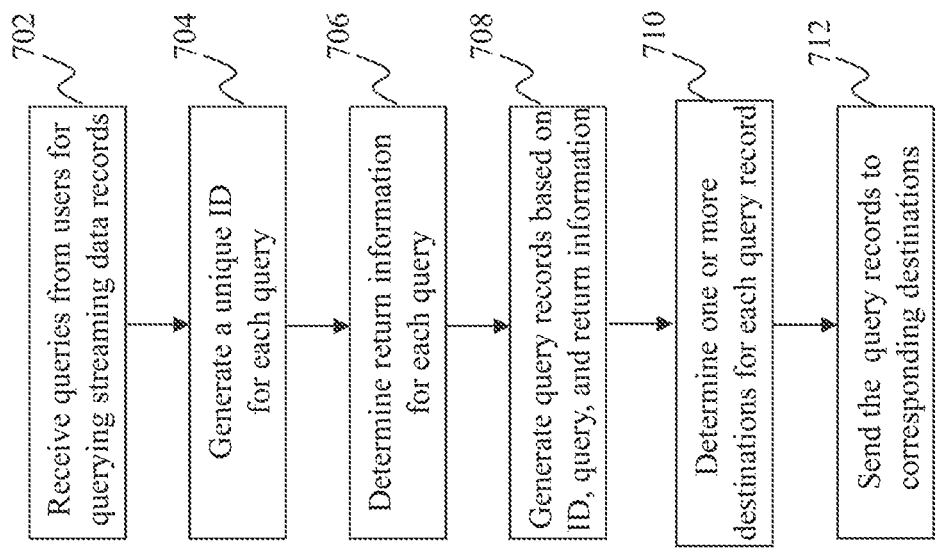
FIG. 7 is a flowchart of an exemplary process performed by a request processor, according to an embodiment of the present teaching.

FIG. 7 is a flowchart of an exemplary process performed by a request processor, e.g. the request processor 410 in FIG. 6, according to an embodiment of the present teaching. At 702, one or more queries are received from users for querying streaming data records. A unique ID is generated at 704 for each query. Return information is determined at 706 for each query.

At 708, query records are generated based on the unique IDs, the queries, and the return information. One or more destinations are determined at 710 for each query record. The query records are sent at 712 to corresponding destinations for either streaming data filtering or matching data aggregation and delivery.

Figure 8:
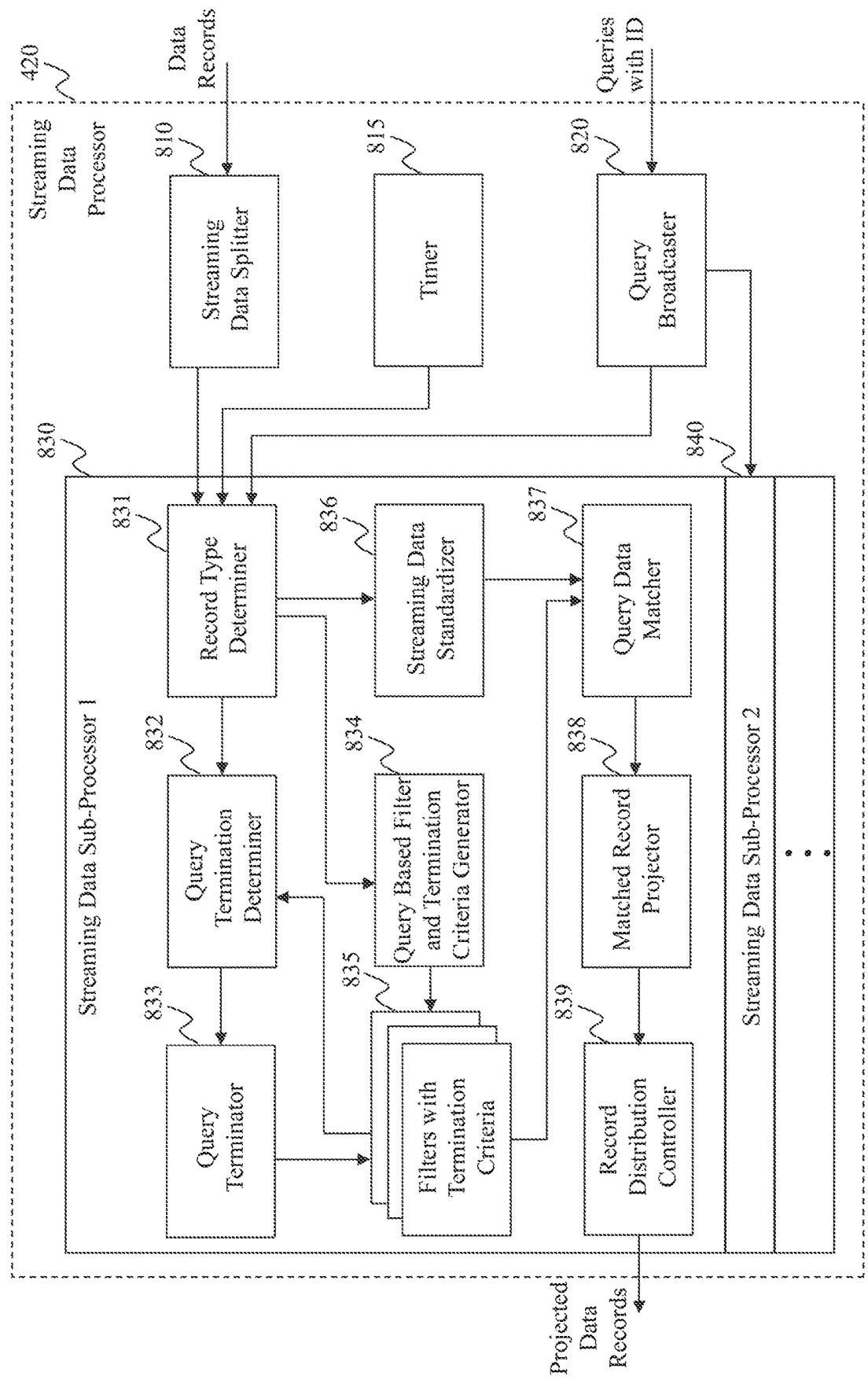
FIG. 8 illustrates an exemplary diagram of a streaming data processor, according to an embodiment of the present teaching.

FIG. 8 illustrates an exemplary diagram of a streaming data processor 420, e.g. the streaming data processor 420 in FIG. 4, according to an embodiment of the present teaching. The streaming data processor 420 in this example includes one or more streaming data sub-processors 830, 840 . . . , a streaming data splitter 810, a timer 815, and a query broadcaster 820. Each of the streaming data sub-processors may include same components. For example, the streaming data sub-processor 830 may include a record type determiner 831, a query termination determiner 832, a query terminator 833, a query based filter and termination criteria generator 834, one or more filters with termination criteria 835 stored therein in a memory, a streaming data standardizer 836, a query data matcher 837, a matched record projector 838, and a record distribution controller 839.

The streaming data splitter 810 in this example may receive streaming data records, split the data records into different portions, and assign each portion to one of the streaming data sub-processors. In one embodiment, the streaming data splitter 820 may assign different portions to different streaming data sub-processors in a random manner to ensure equal load across the streaming data sub-processors.

The query broadcaster 820 in this example may receive queries with ID from the request processor 410 and broadcast them to every streaming data sub-processor. As discussed above, since the <unique ID, query> records are broadcasted to the streaming data processor 420, each of the streaming data sub-processors in this example will receive the same <unique ID, query> records. As such, each of the streaming data sub-processors will filter different portions of the streaming data, based on the same set of queries.

The timer 815 in this example may generate timer records at a consistent frequency, and send the timer records to the streaming data sub-processors. A timer record may be utilized by a streaming data sub-processor to determine whether any query should be terminated.

The record type determiner 831 in this example may receive records from the streaming data splitter 810, the timer 815, and the query broadcaster 820. For each record, the record type determiner 831 may determine a type of this record. The type of the record may be a data record, a query record, or a timer record. If the type of the record is determined to be a query record, the record type determiner 831 may send the query record to the query based filter and termination criteria generator 834 for generating a filter for this query with one or more termination criteria. If the type of the record is determined to be a data record, the record type determiner 831 may send the data record to the streaming data standardizer 836 for converting it into a standard format. If the type of the record is determined to be a timer record, the record type determiner 831 may send the timer record to the query termination determiner 832 for determining whether any query's termination criteria are satisfied.

The query based filter and termination criteria generator 834 in this example may receive query records with IDs from the record type determiner 831. For each received query record, the query based filter and termination criteria generator 834 may generate a set of filters and a set of termination criteria for the query. A filter may be generated based on query specification information as shown in FIG. 3. For example, one filter may be generated to find data records that contain a specific query term; another filter may be generated to find data records that belong to a specific type; and another filter may be generated to find data records that correspond to events happening within a specific time window, etc. As discussed above, the filters may also be generated and determined by the request processor 410 and sent to the streaming data processor 420 for use.

Termination criteria for a query may be used to determine whether and when the query should be terminated. For example, according to various termination criteria, a query may be terminated after a specific time period and/or after data records matching the query reach a specific number. When a query is terminated, all filters generated based on the query should be terminated and the query should be cleaned up from the sub-processor. In one embodiment, the query based filter and termination criteria generator 834 may store the generated filters with termination criteria 835 corresponding to each query into a memory, such that other components can retrieve these filters and/or termination criteria for use. In another embodiment, the query based filter and termination criteria generator 834 may directly send these filters and/or termination criteria to other components for use.

The query termination determiner 832 in this example may receive timer records from the record type determiner 831. For each received timer record, the query termination determiner 832 may determine whether termination criteria of any query are satisfied. For example, the query termination determiner 832 may obtain termination criteria for each active query, either from a memory or from the query based filter and termination criteria generator 834, and determine whether the query should be terminated at this time point according to the timer record. If termination criteria of a query are determined to be satisfied based on the timer record, the query termination determiner 832 can inform the query terminator 833 to terminate the query.

The query terminator 833 in this example may receive an instruction from the query termination determiner 832 and terminate a query based on the instruction. The query terminator 833 may terminate the filters in the memory that are corresponding to the query. The query terminator 833 may also clean up other information related to the query from the memory.

The streaming data standardizer 836 in this example may receive data records from the record type determiner 831 and convert each incoming data record into a standard format, in order to support queries on a streaming pipeline that is processing arbitrary data. As discussed above, the format may be pre-defined thoroughly to support various kinds of data types encountered. The streaming data standardizer 836 may send the standardized records to the query data matcher 837 for query/data matching.

The query data matcher 837 in this example may receive standardized data records from the streaming data standardizer 836. For each received standardized data record, the query data matcher 837 may check whether any of the active queries matches the data record. For each query, the query data matcher 837 may obtain filters corresponding to the query, either from the memory or from the query based filter and termination criteria generator 834, and determine whether the query matches the data record based on the filters. In this manner, the query data matcher 837 may identify all queries matching the data record, and send the IDs of these matching queries together with the data record to the matched record projector 838 for data record projection. Then the query data matcher 837 may perform the matching similarly for next received standardized data record.

The matched record projector 838 in this example may receive data records together with query IDs, from the query data matcher 837. Each data record received by the matched record projector 838 is associated with a query ID, and has been determined to match the query with the associated query ID. For each data record associated with each query ID, the matched record projector 838 may generate a projected copy of the data record, and send the projected copy to the record distribution controller 839 for distribution. For example, when a received data record matches two queries, the matched record projector 838 may generate two projected copies of the data record, where the two projected copies are associated with two different query IDs. The matched record projector 838 may send both projected copies to the record distribution controller 839 for distributing them to corresponding combiner machines, based on their respective associated query IDs.

The record distribution controller 839 in this example may receive projected data records with query IDs from the matched record projector 838. The record distribution controller 839 can determine how to distribute the projected data records, e.g. based on the query IDs. In one embodiment, the record distribution controller 839 may use a hash table—a mechanism to generate a unique number for each query ID. This number identifies a unique combiner machine in the query result combiner 430. Using this hash to identify the combiner machine, the record distribution controller 839 may send all the projected records of the form <unique ID, projected record> to the combiner machine corresponding to the unique query ID. In an embodiment, where the query result combiner 430 has a multi-level structure, the record distribution controller 839 may send all the projected data records to the first-level combiners or sub-combiners.

Figure 9:
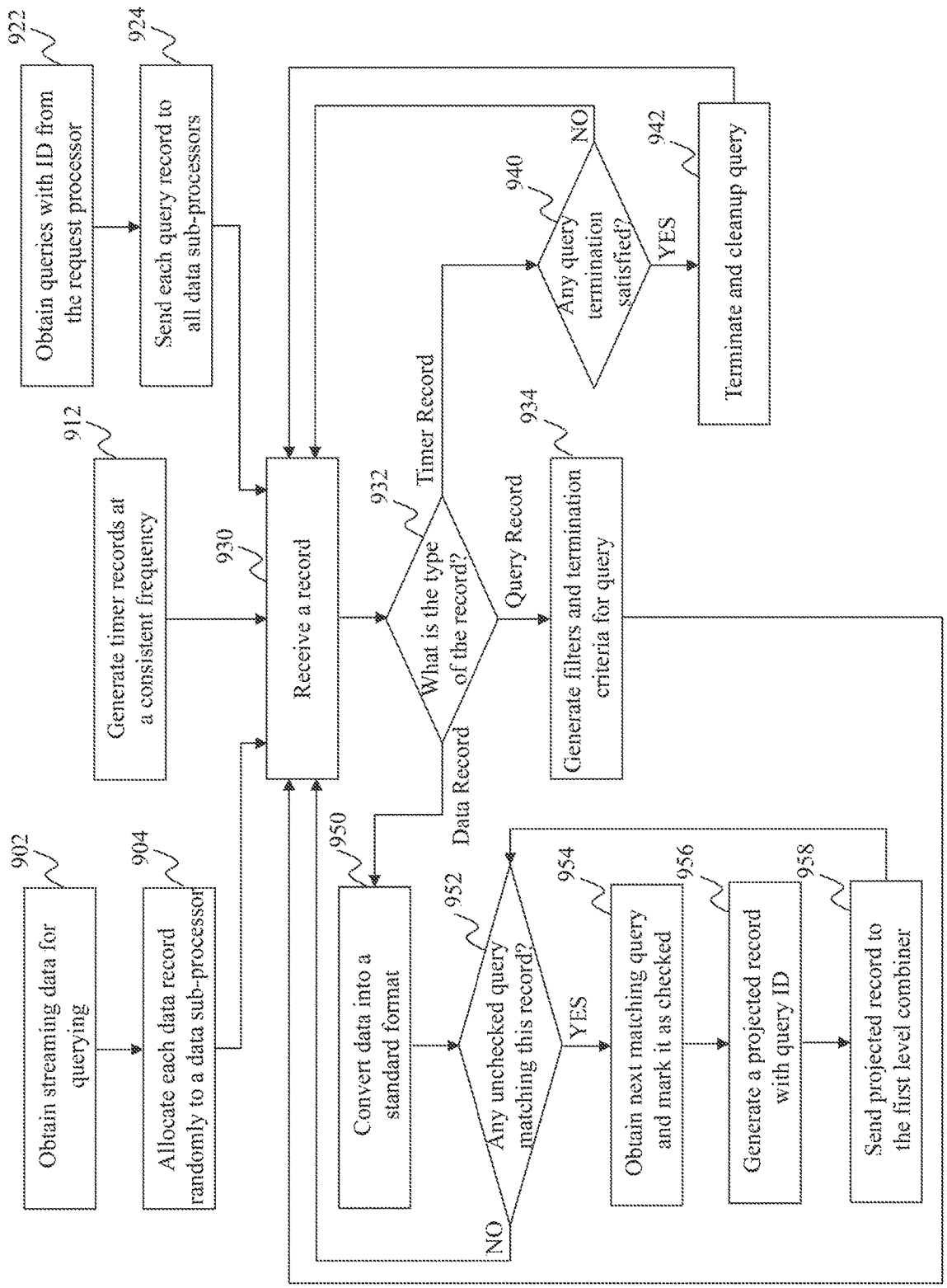
FIG. 9 is a flowchart of an exemplary process performed by a streaming data processor, according to an embodiment of the present teaching.

FIG. 9 is a flowchart of an exemplary process performed by a streaming data processor, e.g. the streaming data processor 420 in FIG. 8, according to an embodiment of the present teaching. At 902, streaming data records are obtained for querying. Each data record is allocated randomly at 904 to a data sub-processor. The process then moves to 930. In parallel to steps 902 and 904, timer records may be generated at 912 at a consistent frequency. In parallel to steps 902 and 904, and in parallel to the step 912, queries with ID may be obtained at 922 from the request processor. Each query record may be sent to all data sub-processors at 924.

At 930, a data sub-processor receives a record. At 932, the type of the record is determined. If the type of the record is determined to be a query record, the process moves to 934, where filters and termination criteria are generated for the query, and the process then moves back to 930 to receive next record.

If the type of the record is determined to be a timer record, the process moves to 940 to determine whether termination criteria for any query are satisfied. If so, the process moves to 942 to terminate and cleanup the query, and then goes back to 930 to receive next record. Otherwise, the process moves back to 930 directly to receive next record.

If the type of the record is determined to be a data record, the process moves to 950 to convert the data record into a standard format. Then at 952, it is determined whether any unchecked query can match this data record. If so, the process moves to 954 to obtain next matching query and mark it as checked. At 956, a projected data record is generated with a query ID corresponding to the matching query. The projected data record is sent at 958 to the first level combiners. The process then moves back to 952 to determine again whether any unchecked query can match this data record. If it is determined at 952 that no more unchecked query can match this data record, the process moves back to 930 to receive next record.

Figure 10:
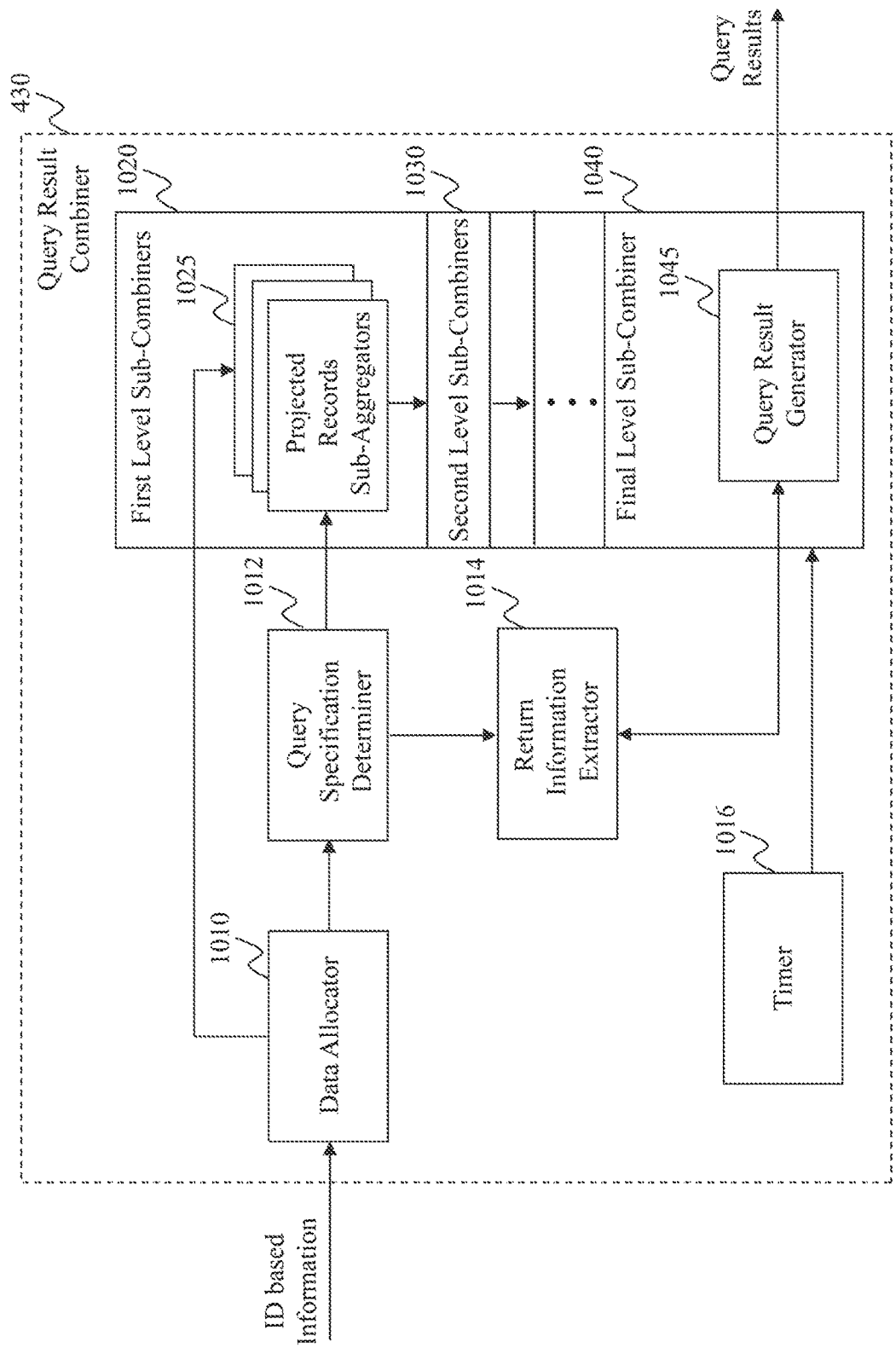
FIG. 10 illustrates an exemplary diagram of a query result combiner, according to an embodiment of the present teaching.

FIG. 10 illustrates an exemplary diagram of a query result combiner 430, e.g. the query result combiner 430 in FIG. 4, according to an embodiment of the present teaching. As shown in FIG. 10, the query result combiner 430 in this example includes a data allocator 1010, a query specification determiner 1012, a return information extractor 1014, a timer 1016 and one or more levels of sub-combiners 1020, 1030 . . . 1040. Each level of sub-combiners may include a plurality of projected records sub-aggregators 1025, except the final level sub-combiner 1040 which comprises a query result generator 1045.

The data allocator 1010 in this example may receive information associated with query IDs from the request processor 410 and the streaming data processor 420. For example, the data allocator 1010 may receive query records in forms of <unique ID, query> and <unique ID, return information> from the request processor 410 and receive query records in form of <unique ID, projected record> from the streaming data processor 420, corresponding to the unique query ID. The data allocator 1010 may allocate the ID based information to different sub-combiners in the first level 1020. Different sub-combiners in the first level correspond to different sets of queries and hence different sets of unique IDs. For example, based on the unique ID for each query record, the data allocator 1010 can allocate the query record to a corresponding sub-combiner in the first level 1020.

The data allocator 1010 may also send the query records to the query specification determiner 1012. The query specification determiner 1012 in this example may determine query specification information for each query. In one example, the query result combiner 430 may obtain query specification information for each query from the streaming data processor 420, instead of determining the query specification information at the query result combiner 430. The query specification information for each query may include information regarding how to aggregate projected records matching this query. For example, the query specification information may indicate to count the total number of projected records matching this query, or to calculate an average period of time when the matched data records come after receipt of the query. The query specification determiner 1012 may send the query specification information to the projected records sub-aggregators 1025 in the first level, and to the return information extractor 1014.

The return information extractor 1014 in this example may extract return information for each query from the query specification information, and send the return information for each query to the final level sub-combiner 1040 for generating and providing query results.

The timer 1016 in this example may generate timer records at a consistent frequency, and send the timer records to the sub-combiners. For example, a timer record may be utilized by the query result generator 1045 to determine whether any query should be terminated and query results for the query should be finalized and sent out accordingly.

In one embodiment, the timer 1016 may be the same as the timer 815, that is located in either the streaming data processor 420 or the query result combiner 430. In another embodiment, the query result generator 1045 may determine to terminate a query based on mechanisms other than time.

Each of the first level sub-combiners 1020 may include a projected records sub-aggregator 1025. Each of the projected records sub-aggregators 1025 in the first level is responsible for aggregating projected records into a plurality of first aggregation groups and sending the first aggregation groups to the sub-combiners in next layer/level. Similarly, each of the sub-combiners in the next layer/level may receive aggregation groups from a previous layer, aggregate the aggregation groups into a plurality of additional aggregation groups, and send the additional aggregation groups to the sub-combiners in next layer/level. The final layer 1040, however, includes merely the query result generator 1045 that is configured for generating one or more query results for each of the plurality of queries and providing the one or more query results as a response to a corresponding query in the plurality of queries.

This topology of multiple-level aggregations has a multi-level arrangement of machines, e.g. due to scalability or required aggregations. In this embodiment, each level of sub-combiners will reduce the number of projected records being sent to the next level by performing a partial version of the aggregation on the records. The first level sub-combiners may receive the <unique ID, query> records that are broadcasted to the first level. The <unique ID, projected record> records are split up across the first level. Finally, the <unique ID, return information> is sent to the last level sub-combiner 1040, which may consist of a single machine query result generator 1045 that is configured for finishing up the aggregations and returning the results to the user, based on the corresponding return information.

In one embodiment, the query result generator 1045 may determine whether an aggregation for a query is done, based on termination conditions associated with the query. For example, a termination condition may specify a predetermined time period for collecting matching records for this query. If so, the query result generator 1045 can determine whether an aggregation for the query is done, e.g. based on timer records received from the timer 1016. After determining the aggregation is done for the query, the query result generator 1045 can finalize the query results for the query, without waiting for more matching records from the streaming data processor 420, and send the query results in response to the query based on return information as discussed before. The query result generator 1045 can terminate and clean up information related to the query from the memory, such that no more aggregation works will be done for this terminated query. A termination condition may also be based on mechanisms other than time.

In accordance with one embodiment, the query result combiner 430 may include multiple sub-combiners that work in parallel to perform only a single layer of aggregations. In this case, each of the sub-combiners will include a query specification determiner, a return information extractor, one or more projected records sub-aggregators, and a query result generator. Different sub-combiners correspond to different sets of queries. Each of the sub-combiners will be responsible for generating and providing query results for a corresponding set of queries.

Figure 11:
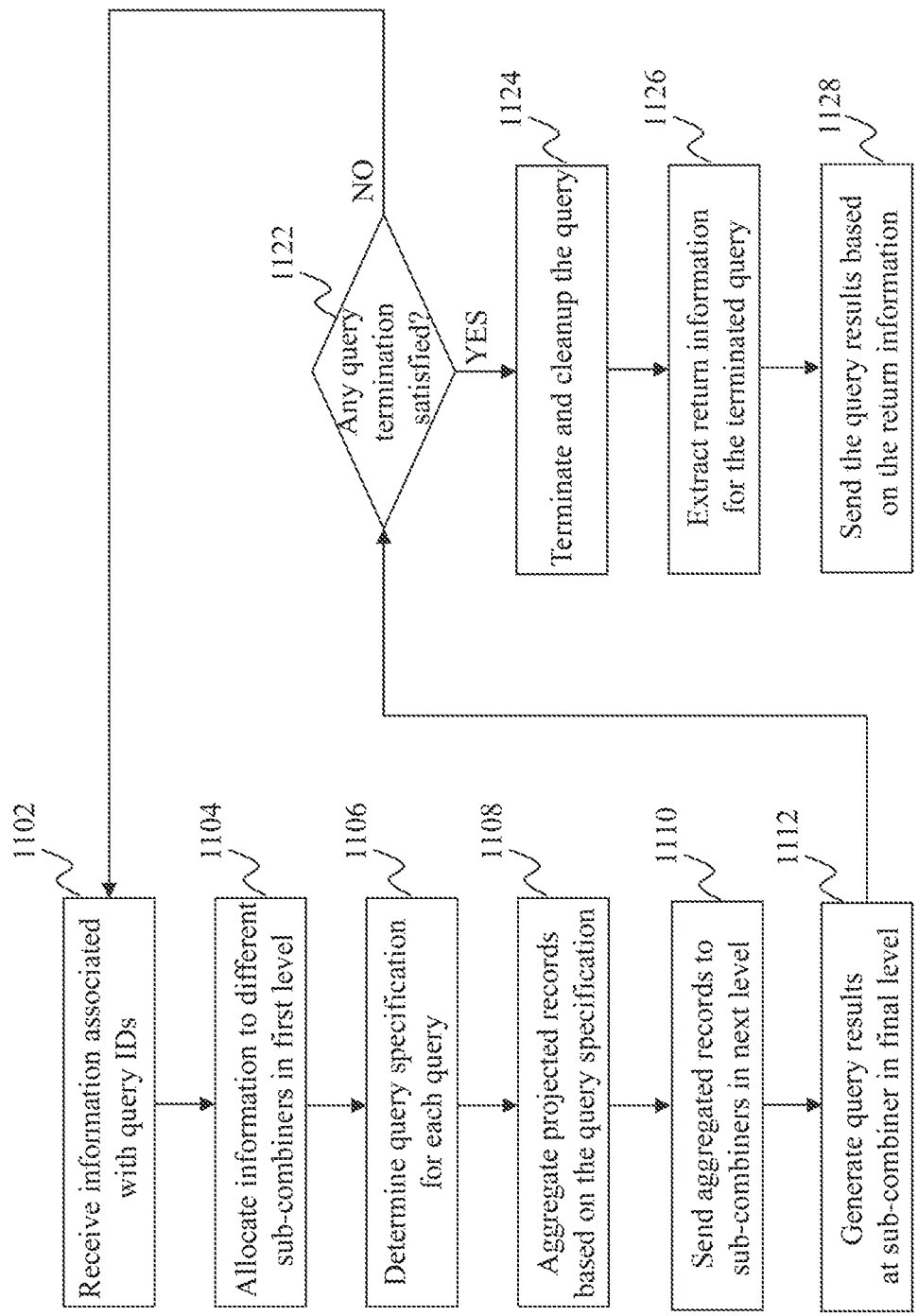
FIG. 11 is a flowchart of an exemplary process performed by a query result combiner, according to an embodiment of the present teaching.

FIG. 11 is a flowchart of an exemplary process performed by a query result combiner, e.g. the query result combiner 430 in FIG. 10, according to an embodiment of the present teaching. Information associated with unique query IDs is received at 1102. The information is allocated at 1104 to different sub-combiners in first level. Query specification information is determined at 1106 for each query. Projected records are aggregated at 1108 based on the query specification information. Aggregated records are sent at 1110 to sub-combiners in next level. It can be understood by one skilled in the art that more steps may exist between 1110 and 1112 to perform record aggregation in a multiple-level structure.

Query results are generated at 1112 by a sub-combiner in the final level. But the system needs to determine whether the query results are final. The process then goes to 1122 to determine, e.g. based on a timer mechanism as described before, whether termination criteria for any query are satisfied, i.e. whether any query needs to terminated and its query results need to be finalized and sent out. If so, the process moves to 1124 to terminate and cleanup the query. Then at 1126, return information is extracted for the terminated query. The query results corresponding to the terminated query are sent at 1128 to corresponding users based on the return information. If it is determined at 1122 that no query should be terminated and no query results are final, the process may move back to 1102 receive more information associated query IDs.

It can be understood that the order of the steps shown in each of FIG. 5, FIG. 7, FIG. 9, and FIG. 11 may be changed according to different embodiments of the present teaching.

Figure 12:
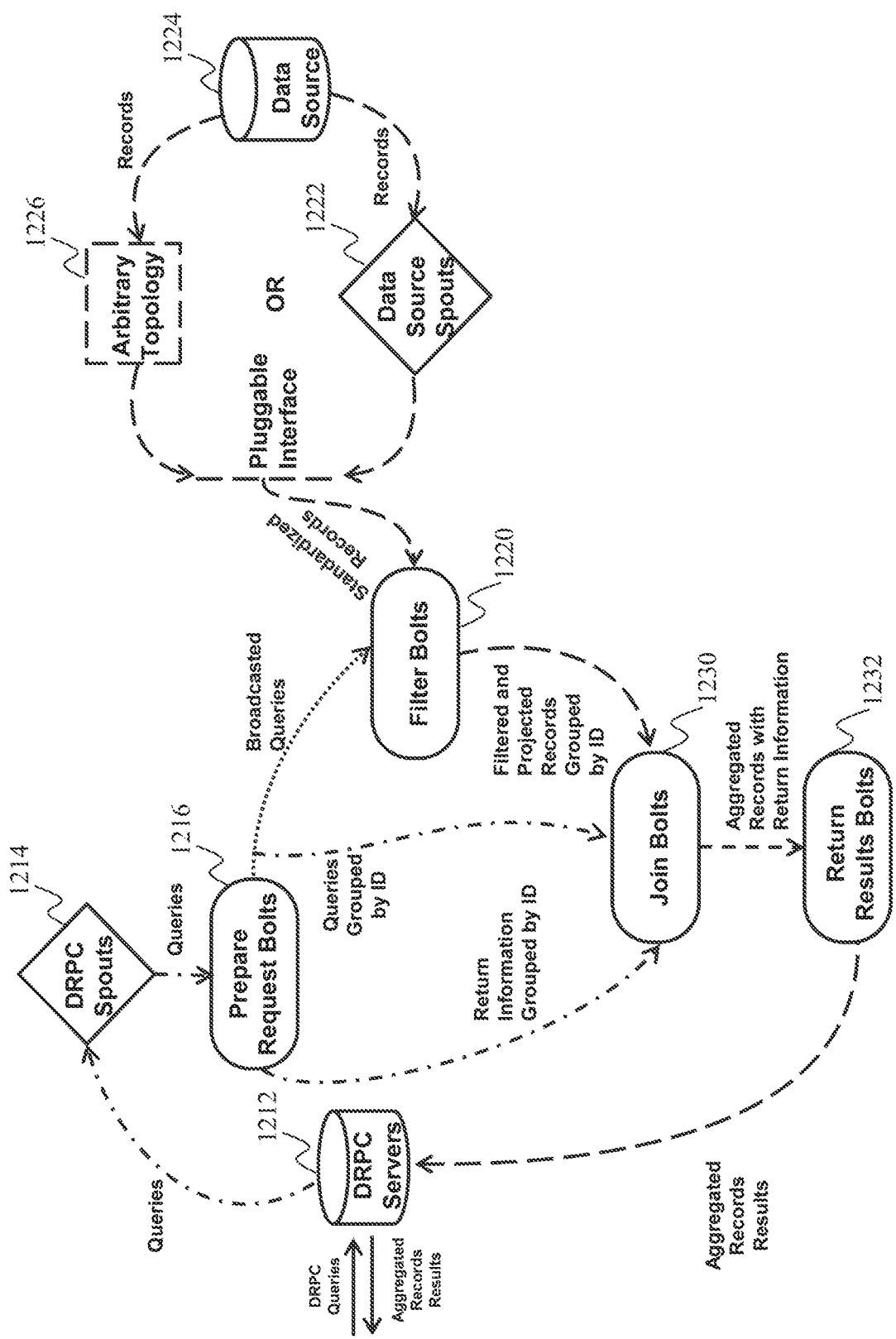
FIG. 12 illustrates an exemplary implementation of the streaming data querying in an Apache Storm system, according to an embodiment of the present teaching.

FIG. 12 illustrates an exemplary implementation of the streaming data querying in an Apache Storm system, according to an embodiment of the present teaching. The system in FIG. 12 uses Storm DRPC (Distributed Remote Procedure Call) to manage injecting requests into and returning results from a topology. The DRPC servers 1212, the DRPC Spouts 1214 and the Prepare Request Bolts 1216 in this example correspond to the request processor 410 as in FIG. 4. The streaming data processor 420 in FIG. 4 corresponds to the Filter Bolts 1220 together with the data source spouts 1222, the data source 1224, and the arbitrary topology 1226. The Filter Bolts 1220 may receive streaming data through the data source spouts 1222 that can convert the data into the standard data format. The Filter Bolts 1220 receive queries and emit records that match each query. The Filter Bolts 1220 also apply any projections to reduce the amount of data being transferred. The query result combiner 430 in FIG. 4 corresponds to the Join Bolts 1230 and the Return Results Bolts 1232. The Join Bolts 1230 combine the return information and apply any aggregations to the matching records. One can do a join on using the unique ID so that all matching records emitted by the Filter Bolts 1220 are managed by a Join Bolt. The results are then emitted using the DRPC infrastructure back to the client.

This reference implementation in FIG. 12 uses a simple Combiner, with only a single level of Join Bolts performing aggregations. In practice, multiple levels of Join Bolts can be built to support multiple levels of aggregations if the amount of data to aggregate is too large for one machine. In practice, most queries, even if needing aggregations, can be satisfied with two or three levels of Join Bolts. If an arbitrary level is desired, one simple way is to introduce a temporary persistence layer to create a loop in the query result combiner where records can flow through the loop till they reach their appropriate levels of aggregation. This can also be used as a check-pointing mechanism.

This disclosed method can allow the tuning of these network machines independently based on whether the user wants to optimize for multiple queries being fielded at one time or to scale for the amount of data being read. Since the request processor and the query result combiner are only operating when there are queries in the system, increasing the parallelism of machines in the streaming data processor may be sufficient (in the first-order) to scale for operating the query system on more data. On the other hand, since records are only emitted by the streaming data processor for queries present in the system, the number of machines in the query result combiner is only dependent on query parameters and the number of queries required to be supported. As a result, if very few queries are expected on a large volume of data, only the streaming data processor machines needs be scaled. If a lot of queries are expected, only the request processor and the query result combiner need be scaled.

Figure 13:
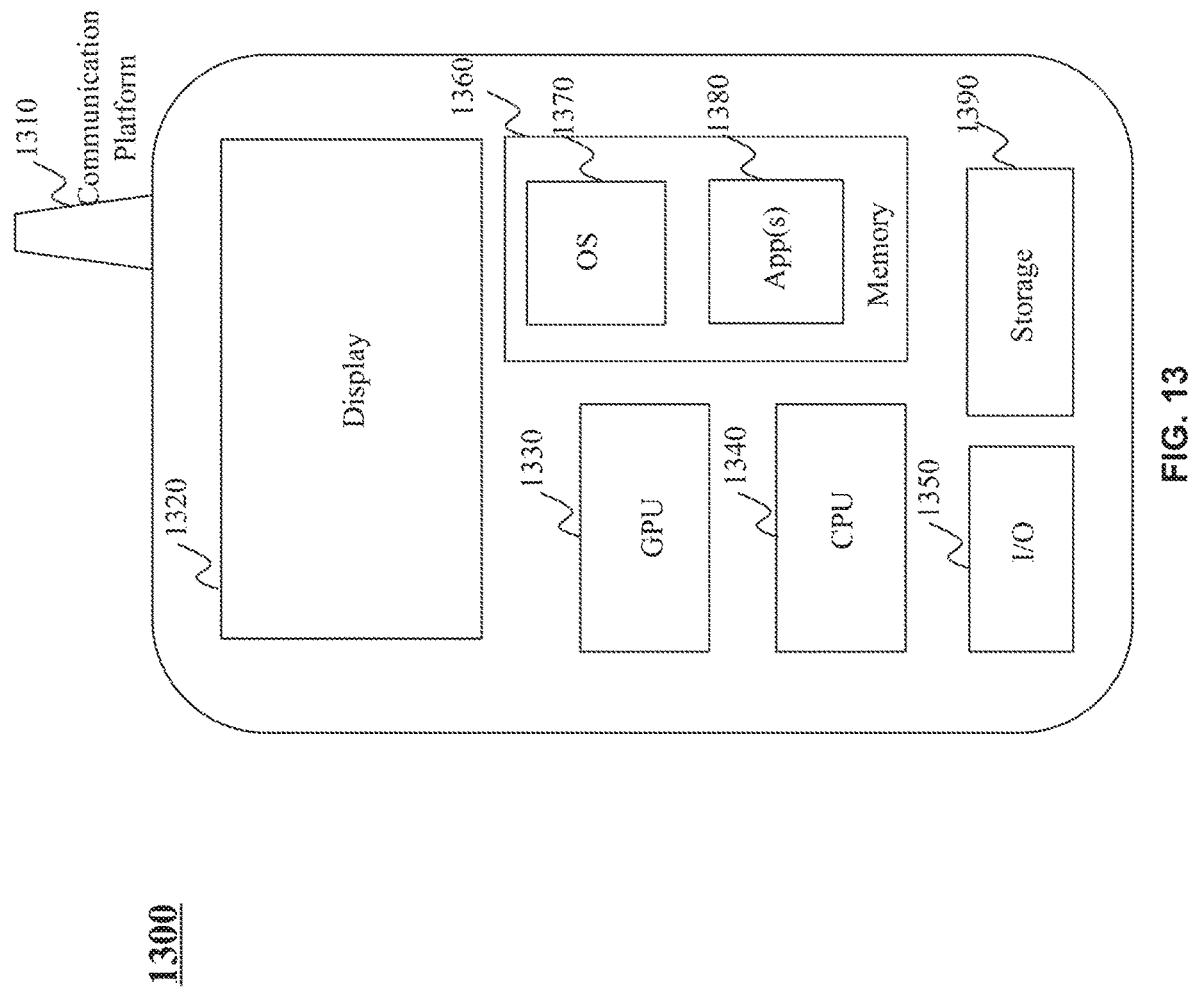
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device on which a query result is presented and interacted-with is a mobile device 1300, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1300. As shown in FIG. 13, a mobile operating system 1370, e.g., iOS, Android, Windows Phone, etc., and one or more applications 1380 may be loaded into the memory 1360 from the storage 1390 in order to be executed by the CPU 1340. The applications 1380 may include a browser or any other suitable mobile apps for receiving query results on the mobile device 1300.

To implement various modules, units, and their functionalities described in the present disclosure, computer hardware platforms may be used as the hardware platform(s) for one or more of the elements described herein (e.g., the streaming data retrieval system 230 and/or other components within the streaming data retrieval system 230 as described with respect to FIGS. 1-12). The hardware elements, operating systems and programming languages of such computers are conventional in nature, and it is presumed that those skilled in the art are adequately familiar therewith to adapt those technologies about querying streaming data as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
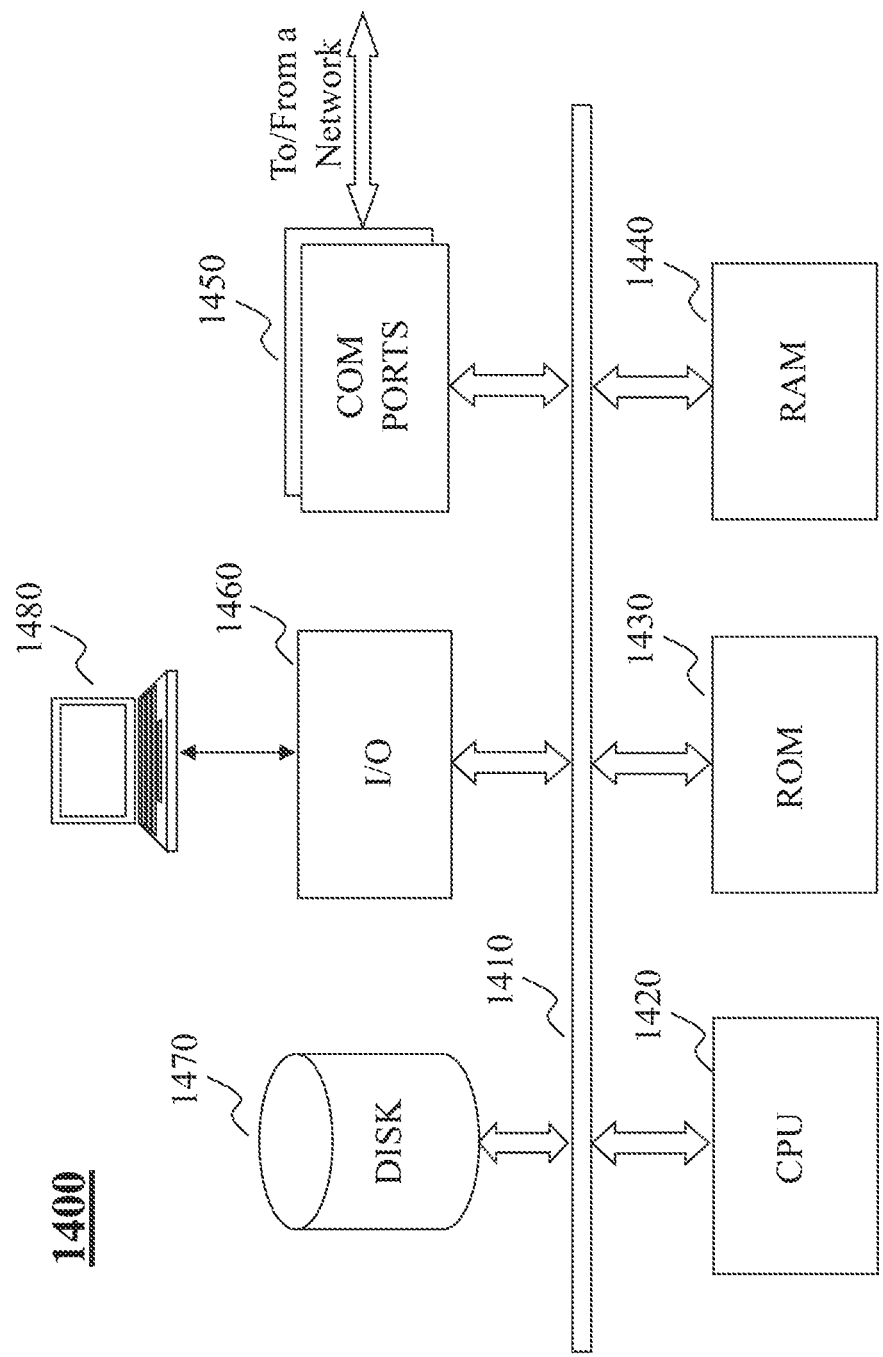
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of the techniques of querying streaming data, as described herein. For example, the streaming data retrieval system 230 and/or its components may be implemented on a computer such as computer 1400, via its hardware, software program, firmware, or a combination thereof. Although only one such computer is shown, for convenience, the computer functions relating to querying streaming data as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of querying streaming data, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with querying streaming data. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, querying streaming data as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for providing query results, the method comprising:
   receiving a query for events, wherein the events occur after receipt of the query;
   monitoring data included in an incoming data stream received subsequent to the query being received, wherein at least some of the data corresponds to at least one of the events, and wherein the incoming data stream is not stored persistently;
   determining whether the data included in the incoming data stream matches the query and corresponds to an event occurring after the query is received;
   generating, based on the determining, one or more query results; and
   providing the one or more query results as a response to the query, wherein
   the query specifies a time window during which a determination is to be made as to whether any of the events has occurred and the query includes at least one query term,
   the data included in the incoming data stream is determined to match the query based on a determination of whether data records of the incoming data stream received within the time window include the at least one query term of the query, and
   projected data records are generated in response to determining that at least some of the data records of the incoming data stream received within the time window includes the at least one query term.

2. The method of claim 1, further comprising:
   determining the time window associated with the query, wherein the time window starts at a current time when the query is received and ends at a future time.

3. The method of claim 1, wherein the query includes at least one query term, the method further comprises:
   determining a record number limit associated with the query, wherein determining whether the data matches the query comprises:
   determining whether data records of the incoming data stream include the at least one query term, and
   generating a projected data record for each of the data records of the incoming data stream that includes the at least one query term until a number of projected data records reaches the record number limit.

4. The method of claim 1, wherein the query includes at least one query term, determining comprises:
   scanning a first data record in the incoming data stream, the first data record being received after the query was received;
   comparing the first data record with the query to determine whether the first data record matches the query based on whether the first data record includes the at least one query term;
   projecting the first data record to generate a projected data record when the first data matches the query, wherein the first data record is not stored persistently; and
   repeating the scanning, comparing, and projecting steps in order with respect to remaining data records in the incoming data stream one by one until the data records are processed with the scanning, comparing, and projecting steps, wherein each projected data record is not stored persistently.

5. The method of claim 1, wherein the time window beginning at a time after the query was received and ending at a specified future time.

6. The method of claim 1, wherein the one or more query results are generated in response to determining that the data matches the query and corresponds to the event occurring after the query is received.

7. A method, implemented on a machine having at least one processor, storage, and a communication platform connected to a network for providing query results, the method comprising:
   receiving, within a predetermined time period, a plurality of queries, wherein each of the plurality of queries is submitted for querying events, wherein the events occur after receipt of a corresponding query;
   monitoring data included in an incoming data stream received subsequent to the plurality of queries being received, wherein at least some of the data corresponds to at least one of the events, and wherein the incoming data stream is not stored persistently;

determining whether the data included in the incoming data stream matches any of the plurality of queries and corresponds to any of the events occurring after the plurality of queries are received;

generating, based on the determining, one or more query results for each of the plurality of queries; and providing the one or more query results as a response to the corresponding query of the plurality of queries, wherein each of the plurality of queries specifies a respective time window during which a determination is to be made as to whether any of the events have occurred and each of the plurality of queries includes at least one query term, the data included in the incoming data stream is determined to match one or more of the plurality of queries based on a determination of whether data records of the incoming data stream received within the respective time window associated with a corresponding query of the plurality of queries include the at least one query term of each respective query of the plurality of queries, and projected data records are generated in response to determining that at least some of the data records of the incoming data stream received within the respective time window associated with the corresponding query of the plurality of queries includes the at least one query term of each respective query of the plurality of queries.

8. The method of claim 7, wherein the method further comprises:
determining the time window associated with each of the plurality of queries, wherein the each respective time window starts at a current time when each respective query is received and continues to a future time when the respective time window ends.

9. The method of claim 7, wherein the query includes at least one query term, the method further comprises:
determining a record number limit associated with each of the plurality of queries, wherein determining whether the data included within the incoming data stream matches any of the plurality of queries comprises:
determining whether data records of the incoming data stream include the at least one query term, and
generating projected data records for each of the data records of the incoming data stream that include the at least one query term until a number of projected data records reaches the record number limit.

10. The method of claim 7, wherein each of the plurality of queries includes at least one query term, determining comprises:
scanning a first data record in the incoming data stream, the first data record being received after each of the plurality of queries was received;
comparing the first data record with each of the plurality of queries to determine whether the first data record matches any of the plurality of queries based on whether the first data record comprises the at least one query term included by any of the plurality of queries;
projecting the first data record to generate a projected data record for each query that matches the first data item, wherein the first data record is not stored persistently; and
repeating the scanning, comparing, and projecting steps in order with respect to remaining data records in the incoming data stream one by one until the data records are processed with the scanning, comparing, and projecting steps, wherein each projected data record is not stored persistently.

11. The method of claim 7, wherein each respective time window begins at a time after the query was received and ends at a specified future time, the specified future time being the same or different for each respective time window.

12. A system having at least one processor, storage, and a communication platform connected to a network for providing query results, comprising:
a request processor configured for receiving a query for events, wherein the events occur after receipt of the query;
a streaming data standardizer configured for monitoring data included in an incoming data stream received subsequent to the query being received, wherein at least some of the data corresponds to at least one of the events, and wherein the incoming data stream is not stored persistently;
a streaming data sub-processor configured for determining whether the data included in the incoming data stream matches the query and corresponds to an event occurring after the query is received; and
a query result generator configured for generating, based on the determining, one or more query results, and providing the one or more query results as a response to the query, wherein
the query specifies a time window during which a determination is to be made as to whether any of the events has occurred and the query includes at least one query term,
the data included within the incoming data stream is determined to match the query based on a determination of whether data records of the incoming data stream received within the time window include the at least one query term of the query, and
projected data records are generated in response to determining that at least some of the data records of the incoming data stream received within the time window includes the at least one query term.

13. The system of claim 12, wherein the streaming data sub-processor further comprises:
a query specification determiner configured for determining the time window associated with the query; and
a matched record projector configured for determining whether the data records of the incoming data steam received within the time window include the at least one query term, wherein the time window starts at a current time when the query is received and ends at a future time.

14. The system of claim 12, wherein the query includes at least one query term, the streaming data sub-processor further comprises:
a query specification determiner configured for determining a record number limit associated with the query, wherein determining whether the data included in the incoming data stream matches the query comprises:
determining whether data records of the incoming data stream include the at least one query term, and
generating a projected data record for each of the data records of the incoming data stream that includes the at least one query term until a number of projected data records reaches the record number limit.

15. The system of claim 12, wherein the query includes at least one query term, the streaming data sub-processor is configured for:

scanning a first data record in the incoming data stream, the first data record being received after the query was received;

comparing the first data record with the query to determine whether the first data record matches the query based on whether the first data record includes the at least one query term;

projecting the first data record to generate a projected data record when the first data item matches the query, wherein the first data record is not stored persistently; and repeating the scanning, comparing, and projecting steps in order with respect to remaining data records in the incoming data stream one by one until the data records are processed with the scanning, comparing, and projecting steps, wherein each data record is not stored persistently.

16. A system having at least one processor, storage, and a communication platform connected to a network for providing query results, comprising:

a request processor configured for receiving, within a predetermined time period, a plurality of queries, wherein each of the plurality of queries is submitted for querying events, wherein the events occur after receipt of a corresponding query;

a streaming data standardizer configured for monitoring data included in an incoming data stream received subsequent to the plurality of queries being received, wherein at least some of the data corresponds to at least one of the events, and wherein the incoming data stream is not stored persistently;

a plurality of streaming data sub-processors configured for determining whether the data included in the incoming data stream matches any of the plurality of queries and corresponds to any of the events occurring after the plurality of queries are received; and a plurality of query result combiners configured for:
generating, based on the determining, one or more query results for each of the plurality of queries, and
providing the one or more query results as a response to the corresponding query of the plurality of queries, wherein each of the plurality of queries specifies a respective time window during which a determination is to be made as to whether any of the events have occurred and each of the plurality of queries includes at least one query term, the data included in the incoming data stream is determined to match one or more of the plurality of queries based on a determination of whether data records of the incoming data stream received within the respective time window associated with a corresponding query of the plurality of queries include the at least one query term of each respective query of the plurality of queries, and projected data records are generated in response to determining that at least some of the data records of the incoming data stream received within the respective time window associated with the corresponding query of the plurality of queries includes the at least one query term of each respective query of the plurality of queries.

17. The system of claim 16, wherein:
the plurality of query result combiners include a plurality of layers each of which includes one or more query result combiners;
the one or more query result combiners in a first layer of the plurality of layers are configured for:

aggregating the projected records into a plurality of first aggregation groups, and sending the first aggregation groups to the one or more query result combiners in a next layer, wherein each of the projected records matches one of the plurality of queries; the one or more query result combiners in a final layer of the plurality of layers are configured for:

generating the one or more query results for each of the plurality of queries, and providing the one or more query results as the response to the corresponding query in the plurality of queries; and the one or more query result combiners in remaining layers of the plurality of layers are configured for:
receiving aggregation groups from a previous layer,
aggregating the aggregation groups into a plurality of additional aggregation groups, and
sending the additional aggregation groups to the one or more query result combiners in a next layer.

18. A non-transitory machine-readable medium having information recorded thereon for providing query results, wherein the information, when read by the machine, causes the machine to perform operations comprising:

receiving a query for events, wherein the events occur after receipt of the query;

monitoring data included in an incoming data stream received subsequent to the query being received, wherein at least some of the data corresponds to at least one of the events, and wherein the incoming data stream is not stored persistently;

determining whether the data included in the incoming data stream matches the query and corresponds to an event occurring after the query is received;

generating, based on the determining, one or more query results; and providing the one or more query results as a response to the query, wherein the query specifies a time window during which a determination is to be made as to whether any of the events has occurred and the query includes at least one query term, the data included in the incoming data stream is determined to match the query based on a determination of whether data records of the incoming data stream received within the time window include the at least one query term of the query, and projected data records are generated in response to determining that at least some of the data records of the incoming data stream received within the time window includes the at least one query term.

19. The non-transitory machine-readable medium of claim 18, wherein the query includes at least one query term, the operations further comprise:

determining a record number limit associated with the query, wherein determining whether the data included in the incoming data stream matches the query comprises:

determining whether data records of the incoming data stream include the at least one query term, and
generating a projected data record for each of the data records of the incoming data stream that includes the at least one query term until a number of data records reaches the record number limit.

20. A non-transitory machine-readable medium having information recorded thereon for providing query results, wherein the information, when read by the machine, causes the machine to perform operations comprising:

receiving, within a predetermined time period, a plurality of queries, wherein each of the plurality of queries is submitted for querying events, wherein the events occur after receipt of a corresponding query;

monitoring data included in an incoming data stream received subsequent to the query being received, wherein at least some of the data corresponds to at least one of the events, and wherein the incoming data stream is not stored persistently;

determining whether the data included in the incoming data stream matches any of the plurality of queries and corresponds to an event occurring after the query is received;

generating, based on the determining, one or more query results for each of the plurality of queries; and providing the one or more query results as a response to the corresponding query of the plurality of queries, wherein each of the plurality of queries specifies a respective time window during which a determination is to be made as to whether any of the events have occurred and each of the plurality of queries includes at least one query term, the data included in the incoming data stream is determined to match one or more of the plurality of queries based on a determination of whether data records of the incoming data stream received within the respective time window associated with a corresponding query of the plurality of queries include the at least one query term of each respective query of the plurality of queries, and projected data records are generated in response to determining that at least some of the data records of the incoming data stream received within the respective time window associated with the corresponding query of the plurality of queries includes the at least one query term of each respective query of the plurality of queries.

* * * * *